(12) United States Patent
Li et al.

(10) Patent No.: US 11,770,772 B2
(45) Date of Patent: Sep. 26, 2023

(54) DISCONTINUOUS RECEPTION FOR SIDELINK CONTROL SIGNALING

(71) Applicant: QUALCOMM Incorporated, San Diego, CA (US)

(72) Inventors: Qing Li, Princeton Junction, NJ (US); Hong Cheng, Basking Ridge, NJ (US); Ozcan Ozturk, San Diego, CA (US); Kapil Gulati, Belle Mead, NJ (US); Dan Vassilovski, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 27 days.

(21) Appl. No.: 17/459,630

(22) Filed: Aug. 27, 2021

(65) Prior Publication Data
US 2022/0070779 A1  Mar. 3, 2022

Related U.S. Application Data

(60) Provisional application No. 63/072,338, filed on Aug. 31, 2020.

(51) Int. Cl.
H04W 72/12 (2023.01)
H04W 52/02 (2009.01)
H04W 72/1263 (2023.01)
H04W 72/20 (2023.01)

(52) U.S. Cl.
CPC ... H04W 52/0232 (2013.01); H04W 52/0235 (2013.01); H04W 72/1263 (2013.01); H04W 72/20 (2023.01)

(58) Field of Classification Search
None
See application file for complete search history.

(56) References Cited

U.S. PATENT DOCUMENTS

| 2017/0164381 | A1* | 6/2017 | Kim | H04W 40/22 |
|---|---|---|---|---|
| 2020/0344722 | A1* | 10/2020 | He | H04W 4/46 |
| 2021/0051653 | A1* | 2/2021 | Park | H04W 8/22 |
| 2021/0084586 | A1* | 3/2021 | Loehr | H04W 52/0229 |
| 2021/0185757 | A1* | 6/2021 | Purkayastha | H04W 76/28 |
| 2021/0400762 | A1* | 12/2021 | Jeong | H04W 76/28 |
| 2022/0007292 | A1* | 1/2022 | Seo | H04W 76/28 |

(Continued)

FOREIGN PATENT DOCUMENTS

| WO | WO-2020033719 A1 * | 2/2020 | H04L 1/1812 |
|---|---|---|---|
| WO | WO-2021138789 A1 * | 7/2021 | |
| WO | WO-2021263106 A2 * | 12/2021 | |

Primary Examiner — Kodzovi Acolatse
(74) Attorney, Agent, or Firm — QUALCOMM Incorporated

(57) ABSTRACT

Embodiments include methods performed by a processor of a wireless device for discontinuous reception. The processor may monitor for sidelink control signaling from a base station using a radio of the wireless device during a sidelink control signaling monitoring duration. The processor may receive sidelink control signaling that allocates a sidelink communication resource and schedules a sidelink communication. The processor may perform the scheduled sidelink communication based on the received sidelink control signaling. The processor may place the radio of the wireless device into a low power mode outside of the sidelink control signaling monitoring duration when no sidelink communication is scheduled.

24 Claims, 18 Drawing Sheets

(56) References Cited

U.S. PATENT DOCUMENTS

| | | | |
|---|---|---|---|
| 2022/0022279 A1* | 1/2022 | Kim | H04W 76/14 |
| 2022/0030661 A1* | 1/2022 | Jeong | H04W 76/28 |
| 2022/0174651 A1* | 6/2022 | Seo | H04W 72/042 |
| 2022/0353815 A1* | 11/2022 | Lin | H04W 52/0232 |
| 2022/0353948 A1* | 11/2022 | Luo | H04W 72/1263 |
| 2022/0369417 A1* | 11/2022 | Park | H04W 24/08 |
| 2023/0066041 A1* | 3/2023 | Guo | H04W 52/0216 |
| 2023/0097552 A1* | 3/2023 | Freda | H04W 76/28 370/329 |

* cited by examiner ial Application No. 63/072,338 entitled "Discon-
DISCONTINUOUS RECEPTION FOR SIDELINK CONTROL SIGNALING

RELATED APPLICATIONS

This application claims the benefit of priority to U.S. Provisional Application No. 63/072,338 entitled "Discontinuous Reception For Sidelink Control Signaling" filed Aug. 31, 2020, the entire contents of which are hereby incorporated by reference for all purposes.

BACKGROUND

A wireless device may communicate with a communication network via communication link with a base station (e.g., a communication link via a Uu interface). The wireless device may also communicate with other wireless devices via a sidelink (e.g., a direct communication link via a PC5 interface). To conserve battery power, the wireless device may place its radio in a low power state when not monitoring for Uu link control signaling for downlink or uplink communications with the network, a procedure called discontinuous reception (DRX). However, wireless devices do not perform DRX for control signaling related to sidelink communications between devices (e.g., in Mode 1 communications, in which the wireless device receives sidelink control signaling from the base station). A wireless device performing sidelink communications cannot place its radio in a low power state for monitoring control signaling via the Uu interface, greatly increasing wireless device power consumption.

SUMMARY

Various aspects include systems and methods of discontinuous reception for sidelink control signaling that may be performed by a processor of a wireless device. Various aspects may include monitoring for sidelink control signaling from a base station using a radio of the wireless device during a sidelink control signaling monitoring duration, receiving the sidelink control signaling, wherein the sidelink control signaling allocates a sidelink communication resource and schedules a sidelink communication, performing the scheduled sidelink communication based on the received sidelink control signaling, and placing the radio of the wireless device into a low power mode outside of the sidelink control signaling monitoring duration when no sidelink communication is scheduled.

Some aspects may include monitoring for a wake-up indication from the base station using the radio of the wireless device, and determining to monitor for sidelink control signaling based on the detected wake-up indication. In some aspects, the wake-up indication may indicate whether to monitor for sidelink control signaling during the sidelink control signaling monitoring duration or whether to monitor for the sidelink control signaling and base station link control signaling during the sidelink control signaling monitoring duration. Some aspects may include receiving from the base station a discontinuous reception configuration. In such aspects, monitoring for the sidelink control signaling from the base station using the radio of the wireless device during the sidelink control signaling monitoring duration may include monitoring for the sidelink control signaling from the base station based on the discontinuous reception configuration.

In some aspects, receiving from the base station the discontinuous reception configuration may include receiving the discontinuous reception configuration in a message with base station link discontinuous reception configuration. In some aspects, receiving from the base station the discontinuous reception configuration may include receiving discontinuous reception control signaling in a Radio Resource Configuration (RRC) message from the base station. In some aspects, the sidelink control signaling may provide information that configures sidelink communication resources, may activate a sidelink resource allocation mode, may provide beam switching information, or may provide sidelink configuration information. In some aspects, monitoring for the sidelink control signaling from the base station using the radio of the wireless device during the sidelink control signaling monitoring duration may include monitoring for the sidelink control signaling and monitoring for base station link control signaling at substantially the same time within a DRX time duration.

In some aspects, monitoring for the sidelink control signaling from the base station using the radio of the wireless device during the sidelink control signaling monitoring duration may include monitoring a Physical Downlink Control Channel (PDCCH) for a dynamically scheduled sidelink transmission using a Sidelink-Radio Network Temporary Identifier (SL-RNTI), a configured scheduled sidelink transmission using a Sidelink Configured Scheduled (SLCS)-RNTI, or a semi-persistently scheduled sidelink transmission for vehicle-to-everything (V2X) sidelink communication using a Sidelink Semi-Persistent Scheduling-V2X (SLSPSV)-RNTI during the sidelink control signaling monitoring duration. In some aspects, monitoring for the sidelink control signaling from the base station using the radio of the wireless device during the sidelink control signaling monitoring duration may include monitoring for the sidelink control signaling and monitoring for base station link control signaling at substantially adjacent times within a DRX time duration. In some aspects, monitoring for the sidelink control signaling from the base station using the radio of the wireless device during the sidelink control signaling monitoring duration may include monitoring for a Control Resource Set (CORESET) for the sidelink control signaling and monitoring for a CORESET for base station link control signaling.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
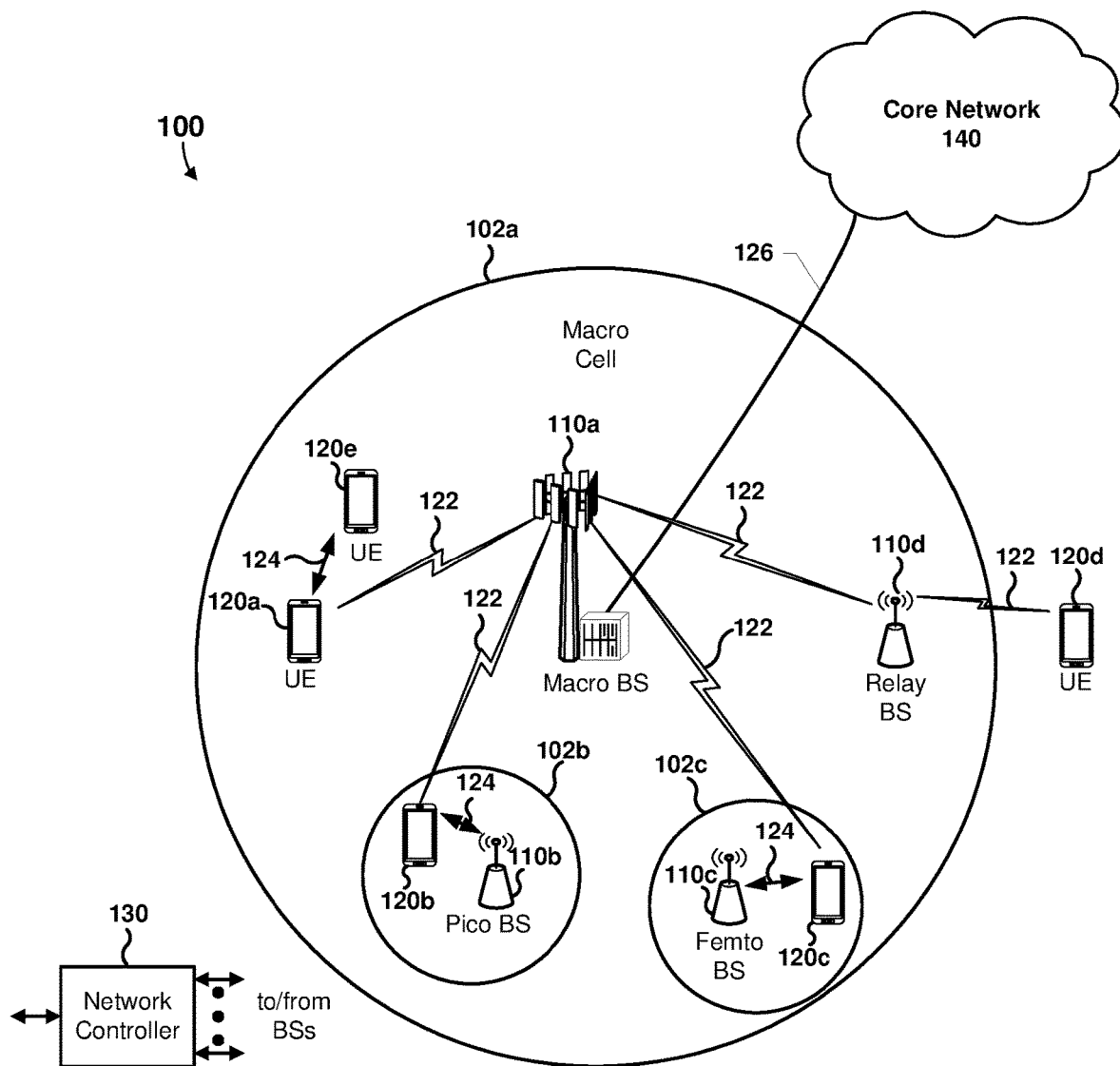
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for discontinuous reception (also referred to herein as "DRX") for sidelink control signaling. Various embodiments may improve the efficiency and utility of wireless devices by enabling a wireless device to operate its radio in a low power or sleep mode when not required to receive sidelink control signaling or to perform sidelink communications.

The term "wireless device" (e.g., user equipment or "UE") is used herein to refer to any one or all of cellular telephones, smartphones, portable wireless devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the term "sidelink control signaling" refers to control information sent by a base station to a wireless device via a communication link between the base station and the wireless device (e.g., a communication link on the Uu interface), referred to herein as a "base station link," that manages aspects of a direct communication link between the wireless device and another wireless device (e.g., a wireless device communication link that uses a PC5 interface), referred to herein as a "sidelink."

As used herein, the terms "discontinuous reception for sidelink" (DRX-SL) and "discontinuous reception procedure for sidelink" (herein "DRX-SL procedure") refer to methods and procedures for performing discontinuous reception of sidelink control signaling sent from a base station to a wireless device via a base station link.

Various embodiments include methods and wireless devices configured to perform the methods that enable a wireless device to perform DRX-SL for monitoring sidelink control signaling received via a base station link. In various embodiments, the wireless device may receive DRX-SL configuration information (e.g., RRC Reconfiguration signaling) from the base station over the base station link, and may perform DRX-SL according to the received configuration. In some embodiments, the base station may provide configuration information to align the DRX-SL operation with other discontinuous reception operations, such as DRX for non-sidelink communications. In some embodiments, the base station may provide configuration information to align DRX-SL performed by more than one wireless device.

Various embodiments may include monitoring for sidelink control signaling from a base station using a radio of the wireless device during a sidelink control signaling monitoring duration, receiving sidelink control signaling that allocates a sidelink communication resource and schedules a sidelink communication, performing the scheduled sidelink communication based on the received sidelink control signaling, and placing the radio of the wireless device into a low power mode outside of the sidelink control signaling monitoring duration when no sidelink communication is scheduled. In some embodiments, the wireless device may receive from the base station a DRX-SL configuration message (referred to herein as a "DRX-SL configuration"), and may monitor for the sidelink control signaling from the base station based on configuration information in the DRX-SL configuration. In some embodiments, the wireless device may receive from the base station a wake-up signal that indicates to the wireless device that it should monitor for the sidelink control signaling.

In some embodiments, the DRX-SL configuration may include a variety of parameters to define the DRX-SL procedure on the base station link. Examples of such parameters may include a sidelink DRX cycle length and a time offset (e.g., a starting point) of the DRX cycle. Such parameters may also include a duration during which the wireless device may monitor for sidelink control signaling from the base station, such as how long the wireless device should operate its radio in an active communication state, for example, for monitoring Downlink Control Information (DCI) indicating the resource allocation(s) for a sidelink transmission and/or retransmission(s), or for another example, for monitoring a Medium Access Control-Control Element (MAC CE) for sidelink control or management or an RRC IE for sidelink control or management. An inactivity timer may be provided for indicating a duration from a DCI scheduling a sidelink communication to extend an active state of the wireless device (i.e., how long the wireless device should operate its radio in an active communication state). Such parameters may also include a Hybrid Automatic Repeat Request (HARQ) timer (e.g., a round trip timer (RTT)), which may indicate a minimum duration before a sidelink link assignment indicated by a DCI for sidelink HARQ retransmission. Such parameters may also include a retransmission timer that may indicate a maximum duration to wait for an assignment of resource(s) for an incoming sidelink retransmission. The DRX-SL configuration may include other parameters, additional parameters, or fewer parameters, without limitation.

In some embodiments, the sidelink control signaling may provide information that configures sidelink communication resources, indicates a sidelink resource allocation mode, provides beam switching information, or provides sidelink configuration information. In some embodiments, the DCI format (e.g., DCI format 3) may activate or deactivate resource configuration(s) for sidelink communications (e.g., configured grant type 2). In some embodiments, a DCI format (e.g., DCI3 or another DCI format (e.g., DCIx) or an indication in the MAC CE may provide information that controls operation mode activation, deactivation, or switching (e.g., between sidelink resource allocation mode 1 and mode 2). In some embodiments, a DCI format (e.g., DCI3 or another DCI format (DCIx) or an indication in the MAC CE may provide information that controls beam switching on sidelink. In some embodiments, the sidelink control signaling may comprise RRC messages for sidelink resource configuration or reconfiguration (e.g., configured grant type 1 with RRC).

In some embodiments, the transmission and reception of the sidelink control signaling may be coordinated with base station link control signaling. Base station link control signaling sent from the base station to the wireless device may configure aspects of the communication link between the base station and the wireless device, such as base station link parameters, scheduling of downlink and/or uplink communication, and other aspects. Coordinating the transmission and reception of the sidelink control signaling and the base station link control signaling may increase the efficiency with which the wireless device monitors (and/or receives) both sidelink and base station link control signaling. In some embodiments, the wireless device may monitor for the sidelink control signaling (e.g., downlink control information (DCI) for sidelink scheduling or for sidelink configured grant type 2 activation or deactivation) and for the base station link control signaling (e.g., DCI for downlink (DL) or uplink (UL) scheduling) at substantially the same time, e.g. via a Control Resource Set (CORESET) for both sidelink control signaling and base station link control signaling jointly in a search space, or via a CORESET for sidelink control signaling and a CORESET for base station link control signaling separately in same or different search space during a DRX time duration (e.g., a DRX-on duration or active time).

In some embodiments, the wireless device may monitor a PDCCH (Physical Downlink Control Channel) for a dynamically scheduled sidelink transmission or retransmission using SL-RNTI (Sidelink-Radio Network Temporary Identifier), configured scheduled sidelink transmission or retransmission using SLCS (Sidelink Configured Scheduled)-RNTI (e.g., activation or deactivation for configured grant type 2), and/or semi-persistently scheduled sidelink transmission or retransmission for V2X sidelink communication using SLSPSV (Sidelink Semi-Persistent Scheduling-V2X)-RNTI during a sidelink control signaling monitoring duration, such as during an active period of discontinuous reception for scheduling downlink (DL) or uplink (UL) traffic (e.g., a Uu DRX on duration or active time). In some embodiments, the wireless device may not monitor the PDCCH for such sidelink control information during a DRX inactive period (e.g., a Uu DRX in-active time).

In some embodiments, the wireless device may monitor for the sidelink control signaling and monitor for the base station link control signaling at substantially adjacent times, e.g., via a CORESET for sidelink control signaling and a CORESET for base station link control signaling separately in a same or a different search space. In some embodiments, the wireless device may monitor for a CORESET for the sidelink control signaling and monitor for a CORESET for the base station link control signaling separately in a different search space. In such embodiments, the wireless device may monitor for the sidelink control signaling and for the base station link control signaling at different time durations (e.g., different DRX-on duration or active time).

In some embodiments, the wireless device may receive the DRX-SL configuration in a message including base station link discontinuous reception configuration. In some embodiments, the wireless device may receive the discontinuous reception configuration in an RRC message from the base station. In some embodiments, the wireless device may receive the discontinuous reception configuration in a Non-Access-Stratum (NAS) message from the base station, for example, when the wireless device is operating in an RRC Inactive state or RRC Idle state.

FIG. 1 is a system block diagram illustrating an example communication system 100 suitable for implementing any of the various embodiments. The communications system 100 may be a 5G New Radio (NR) network, or any other suitable network such as a Long Term Evolution (LTE) network.

The communications system 100 may include a heterogeneous network architecture that includes a core network 140 and a variety of wireless devices (illustrated as wireless devices 120a-120e in FIG. 1). The wireless devices 120a-120e are examples of wireless devices. The communications system 100 may also include a number of base stations (illustrated as the BS 110a, the BS 110b, the BS 110c, and the BS 110d) and other network entities. A base station is an entity that communicates with wireless devices, and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a wireless device) and transmit the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplexing (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. A wireless device 120a-120e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some embodiments, two or more wireless devices 120a-120e (for example, illustrated as the wireless device 120a and the wireless device 120e) may communicate directly using one or more sidelink channels 124 (e.g., a PC5 interface). The wireless devices 120a-120e may perform sidelink communications without using a base station 110a-110d as an intermediary to communicate with one another. For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In some embodiments (e.g., sidelink Mode 1 operations), the wireless devices 120a-120e may receive control signaling from a base station 110a-110d for managing sidelink communication resources. In some embodiments (e.g., sidelink Mode 2 operations), the wireless devices 120a-120e may perform scheduling operations, resource selection operations, as well as other operations described elsewhere herein as being performed by the base station 110a.

Figure 2:
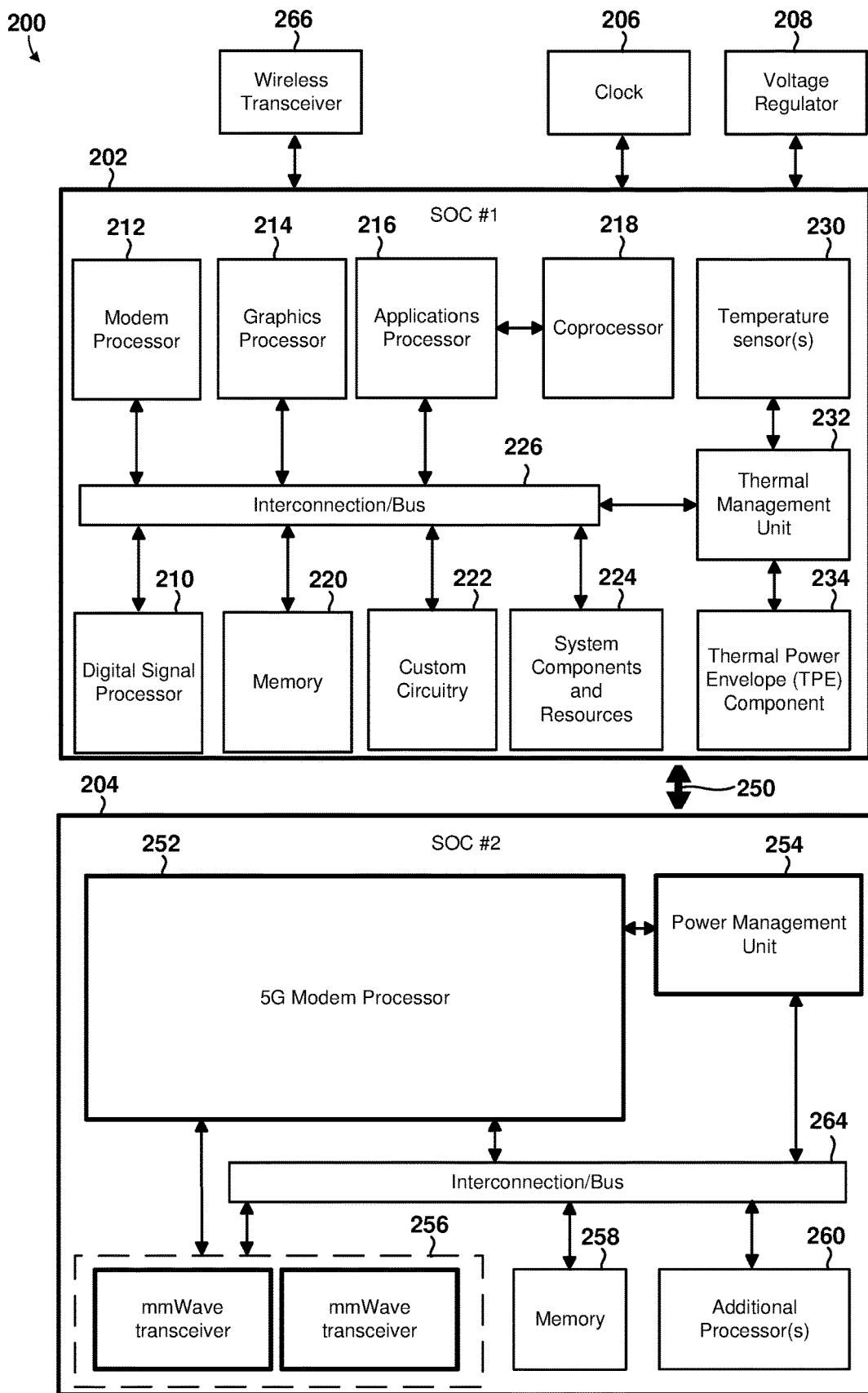
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/ cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
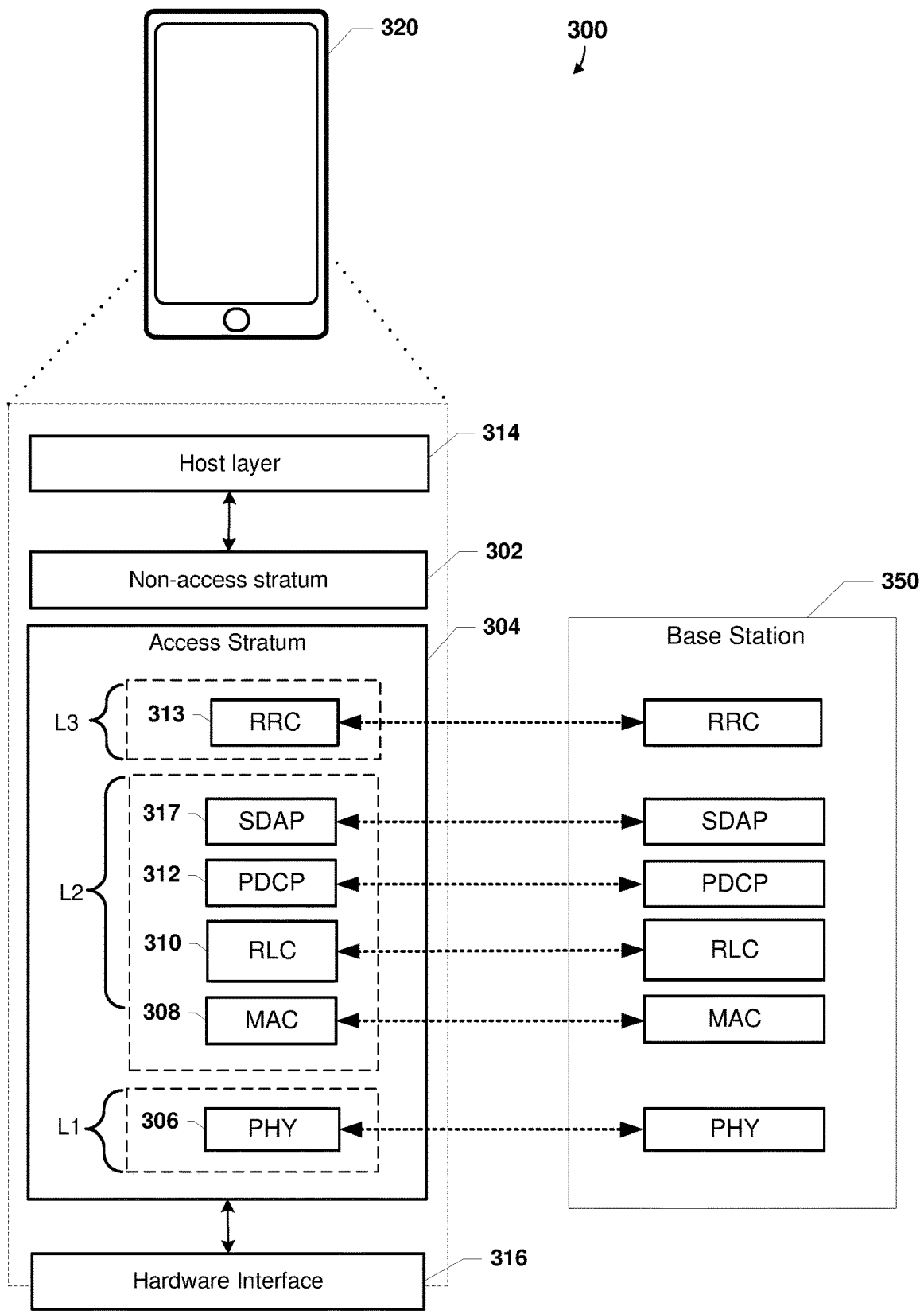
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 256). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer (only for user plane), each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the SDAP sublayer 317 may provide mapping between Quality of Service (QoS) flows and data radio bearers (DRBs). In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
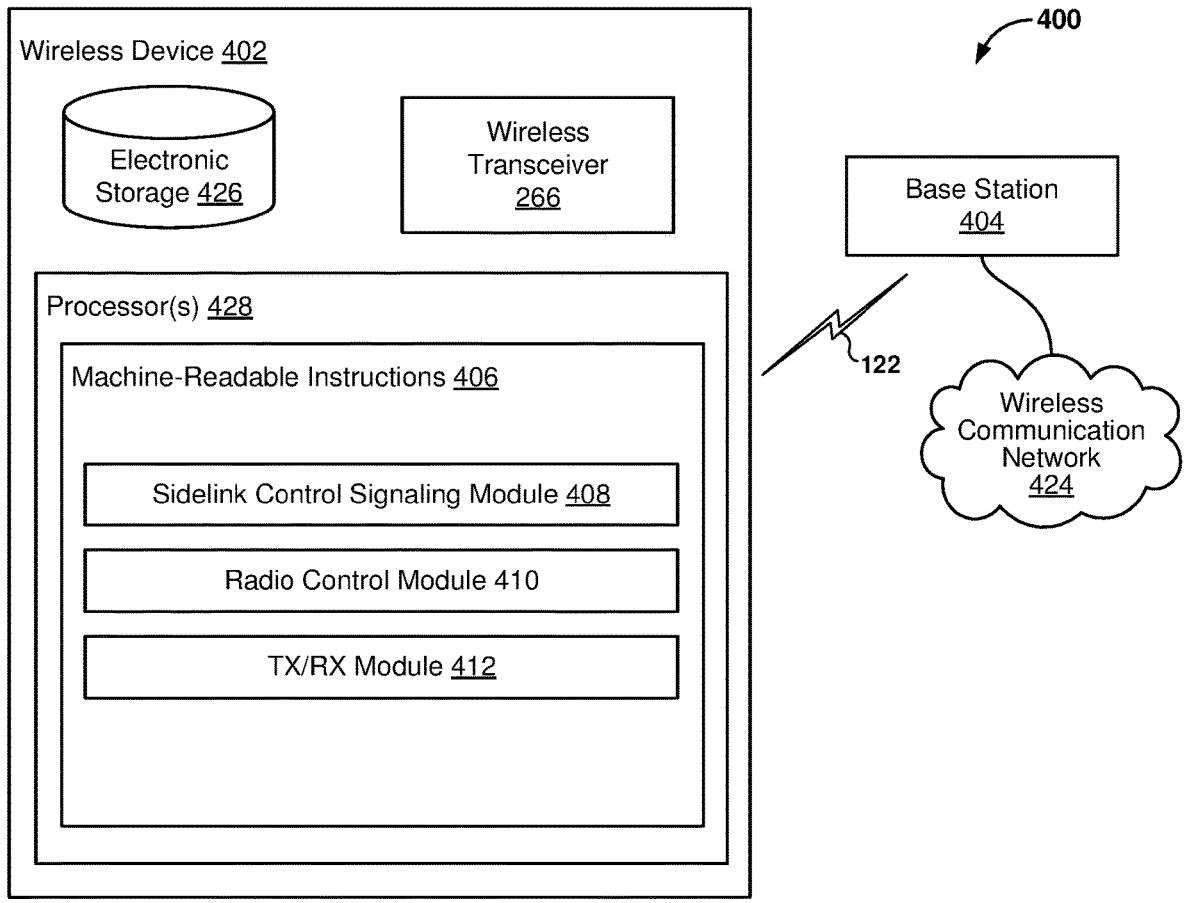
FIG. 4 is a component block diagram illustrating a system configured for discontinuous reception for sidelink control signaling accordance with various embodiments.

FIG. 4 is a component block diagram illustrating a system 400 configured for discontinuous reception for sidelink control signaling accordance with various embodiments. With reference to FIGS. 1-4, system 400 may include wireless device 402 (e.g., 120a-120e, 200, 320) and base station 404 (e.g., 110a-110d, 200, 350). In some embodiments, wireless device 402 and the base station 404 may communicate over a wired or wireless communication link 122 (aspects of which are illustrated in FIG. 1).

The wireless device 402 may include one or more processors 428 coupled to electronic storage 426 and a wireless transceiver (e.g., 266). The wireless transceiver 266 may be configured to receive messages sent in downlink transmissions from base station 404 and pass such message to the processor(s) 428 for processing. Similarly, the processor(s) 428 may be configured to send a message for uplink transmission to the wireless transceiver 266 for transmission to the base station 404 for conveyance to the wireless communication network 424.

The processor(s) 428 may be configured by machine-readable instructions 406. Machine-readable instructions 406 may include one or more instruction modules. The instruction modules may include computer program modules. The instruction modules may include one or more of a sidelink control signaling module 408, a radio control module 410, a transmit/receive (TX/RX) module 412, or other instruction modules.

The sidelink control signaling module 408 may be configured to monitor for sidelink control signaling from the base station 404 using a radio of the wireless device (e.g., the wireless transceiver 266) during a sidelink control signaling monitoring duration.

The radio control module 410 may be configured to place the radio of the wireless device into a low power mode outside of the sidelink control signaling monitoring duration when no sidelink communication is scheduled.

The transmit/receive (TX/RX) module 412 may be configured to perform scheduled sidelink communication outside of the sidelink control signaling monitoring duration when sidelink communication is scheduled in sidelink control signaling received from the base station The electronic storage 426 may include non-transitory storage media that electronically stores information. The electronic storage media of electronic storage 426 may include one or both of system storage that is provided integrally (i.e., substantially non-removable) with the wireless device 402 and/or removable storage that is removably connectable to the wireless device 402 via, for example, a port (e.g., a universal serial bus (USB) port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from the wireless device 402, or other information that enables the wireless device 402 to function as described herein.

Processor(s) 428 may be configured to provide information processing capabilities in the wireless device 402. As such, the processor(s) 428 may include one or more of a digital processor, an analog processor, a digital circuit designed to process information, an analog circuit designed to process information, a state machine, and/or other mechanisms for electronically processing information. Although the processor(s) 428 are illustrated as single entities, this is for illustrative purposes only. In some embodiments, the processor(s) 428 may include a plurality of processing units and/or processor cores. The processing units may be physically located within the same device, or processor(s) 428 may represent processing functionality of a plurality of devices operating in coordination. The processor(s) 428 may be configured to execute modules 408-412 and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-412 described below is for illustrative purposes, and is not intended to be limiting, as any of modules 408-412 may provide more or less functionality than is described. For example, one or more of the modules 408-412 may be eliminated, and some or all of its functionality may be provided by other modules 408-412. As another example, the processor(s) 428 may be configured to execute one or more additional modules that may perform some or all of the functionality attributed below to one of the modules 408-412.

Figure 5A:
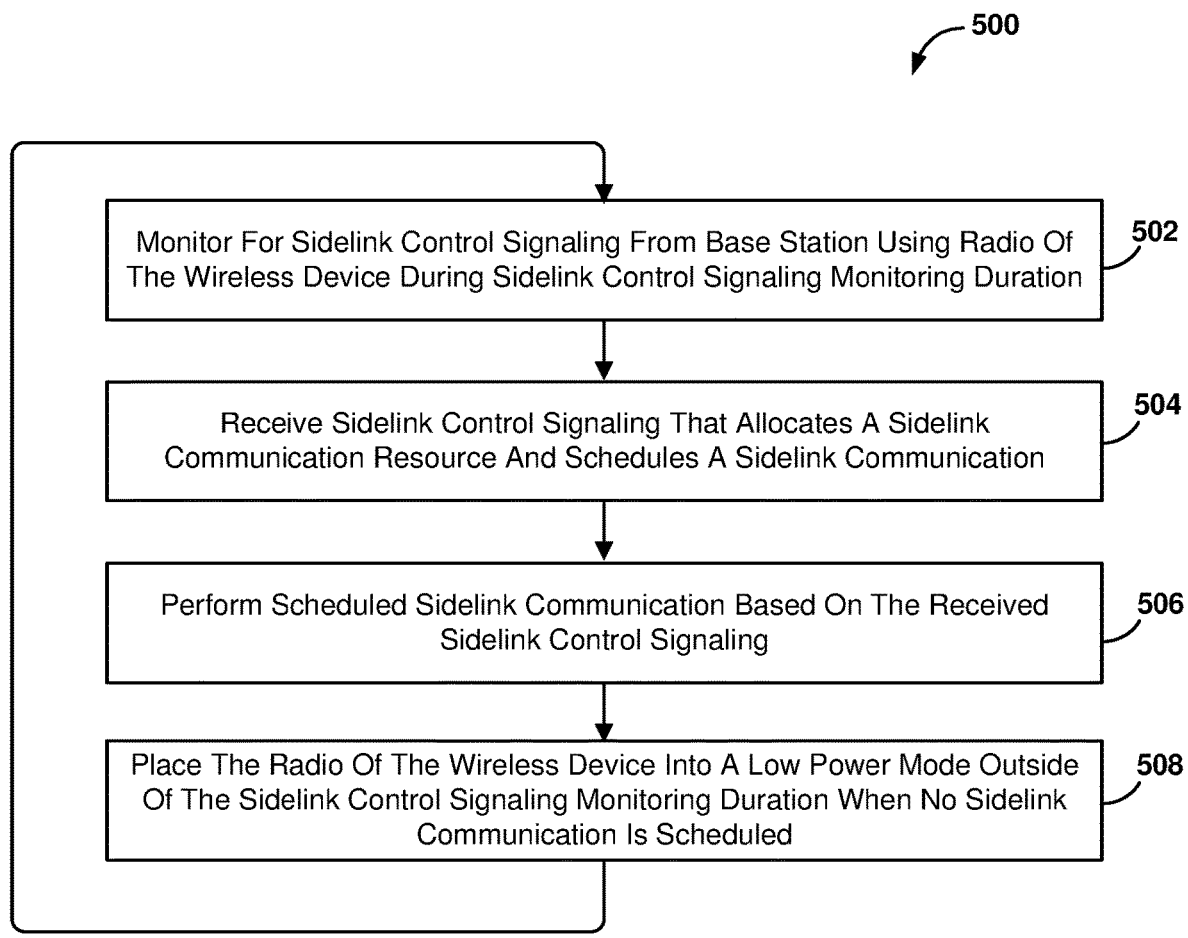
FIG. 5A is a process flow diagram illustrating a method that may be performed by a processor of a wireless device for discontinuous reception for sidelink control signaling in accordance with various embodiments.

FIG. 5A is a process flow diagram illustrating a method 500 that may be performed by a processor of a wireless device for DRX-SL for sidelink control signaling in accordance with various embodiments. With reference to FIGS. 1-5A, the method 500 may be implemented by a processor (e.g., 210, 212, 214, 216, 218, 252, 260, 428) of a wireless device (e.g., the wireless devices 120a-120e, 200, 320, 402).

In block 502, the processor may monitor for sidelink control signaling from a base station using a radio of the wireless device during a sidelink control signaling monitoring duration. In some embodiments, when the radio of the wireless device is in a low power mode the processor may activate the radio to monitor for the sidelink control signaling. Means for performing functions of the operations in block 502 may include the processor (e.g., 210, 212, 214, 216, 218, 252, 260, 428) and the wireless transceiver (e.g., 266).

In block 504, the processor may receive the sidelink control signaling. In some embodiments, the sidelink control signaling allocates a sidelink communication resource and schedules a sidelink communication. Means for performing functions of the operations in block 504 may include the processor (e.g., 210, 212, 214, 216, 218, 252, 260, 428) and the wireless transceiver (e.g., 266).

In block 506, the processor may perform scheduled sidelink communication after successfully detecting the sidelink control signaling when sidelink communication resource is allocated in sidelink control signaling received from the base station. For example, the sidelink communication resources may be dynamically scheduled for sidelink transmission or retransmission by the base station via DCI, e.g., by dynamic scheduling using SL-RNTI. For another example, the sidelink communication resources may be semi-persistently scheduled by the base station for configured scheduled sidelink transmission or retransmission via DCI activation and/or deactivation using SLCS-RNTI (i.e., for configured grant type 2) or for semi-persistently scheduled sidelink transmission or retransmission for V2X sidelink communication using SLSPSV-RNTI. For another example, the sidelink communication resources may be statically configured by the base station via RRC message, i.e. for configured grant type 1. Means for performing functions of the operations in block 506 may include the processor (e.g., 210, 212, 214, 216, 218, 252, 260, 428) and the wireless transceiver (e.g., 266).

In block 508, the processor may place the radio of the wireless device into a low power mode outside of the sidelink control signaling monitoring duration when no sidelink communication is scheduled. Means for performing functions of the operations in block 508 may include the processor (e.g., 210, 212, 214, 216, 218, 252, 260, 428).

The processor may repeat the operations of blocks 502-506 from time to time.

FIGS. 5B-5E are conceptual block diagrams illustrating an example of a DRX-SL cycle 520 for sidelink control signaling in accordance with various embodiments. With reference to FIGS. 1-5D, operations of the DRX-SL cycle 520 may be implemented by a processor (e.g., 210, 212, 214, 216, 218, 252, 260, 428) of a wireless device 524 (e.g., the wireless devices 120a-120e, 200, 320, 402) and a base station 522 (e.g., the base station 110a-110d).

Figure 5B:
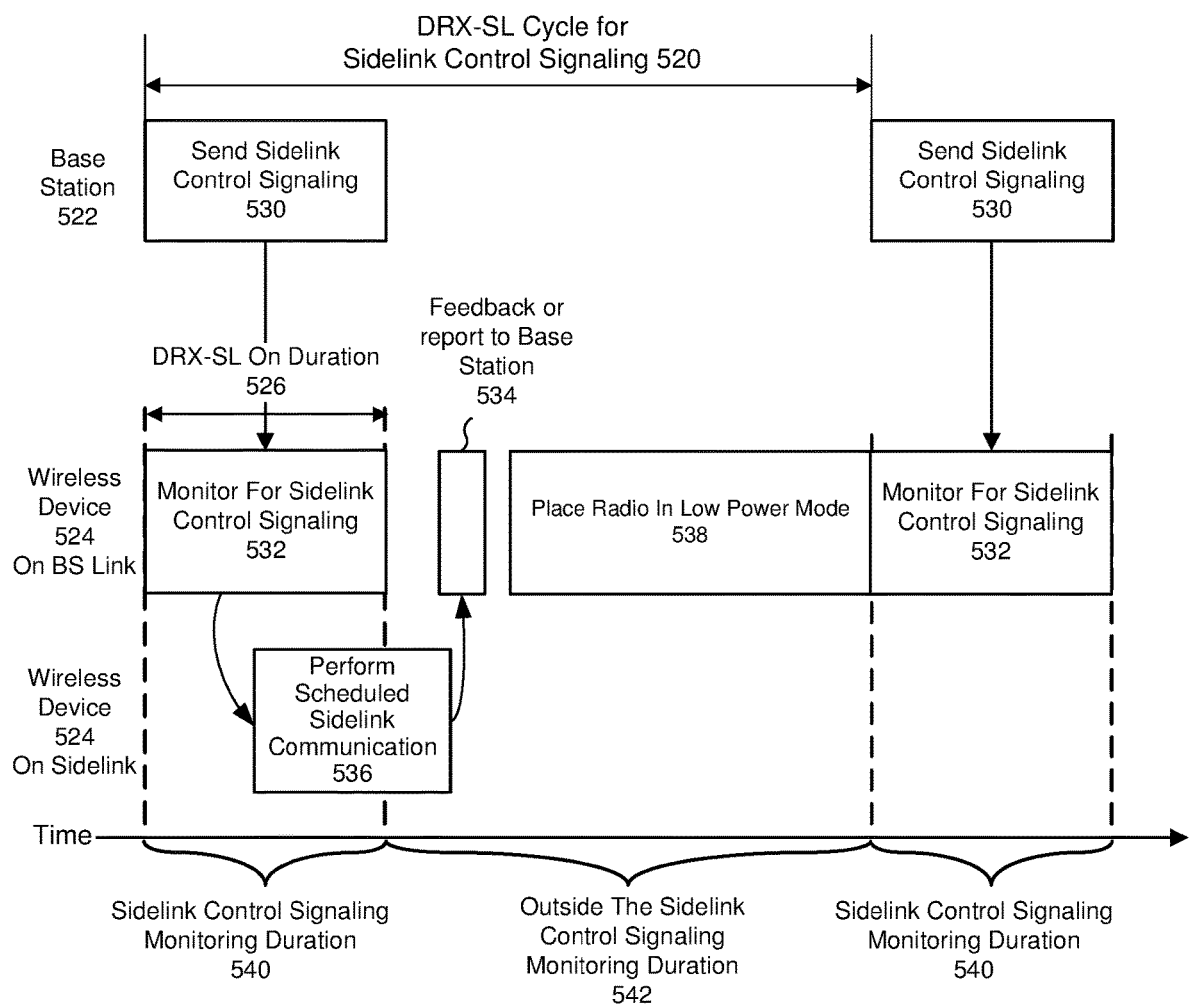
FIGS. 5B-5F are conceptual block diagrams illustrating examples of discontinuous reception for sidelink cycles for sidelink control signaling in accordance with various embodiments.

Referring to FIG. 5B, during a sidelink control signaling monitoring period 540, i.e. DRX-SL On Duration 526, the base station 522 may send sidelink control signaling 530 to the wireless device 524 via the base station link. The wireless device 524 may monitor for the sidelink control signaling 532 during the sidelink control signaling monitoring period 540. After successfully receiving the sidelink control signaling, the wireless device may perform scheduled sidelink communications 536, such as with another wireless device using a sidelink communication link (e.g., via a PC5 interface), and may send feedback or a report 534 to the base station 522. If no further sidelink communication is scheduled within the period 542 (i.e., after sidelink communication 536 is completed and the associated feedback or report to the base station 534 is sent), the wireless device may place the radio of the wireless device into a low power mode (e.g., during period 538).

Figure 5C:
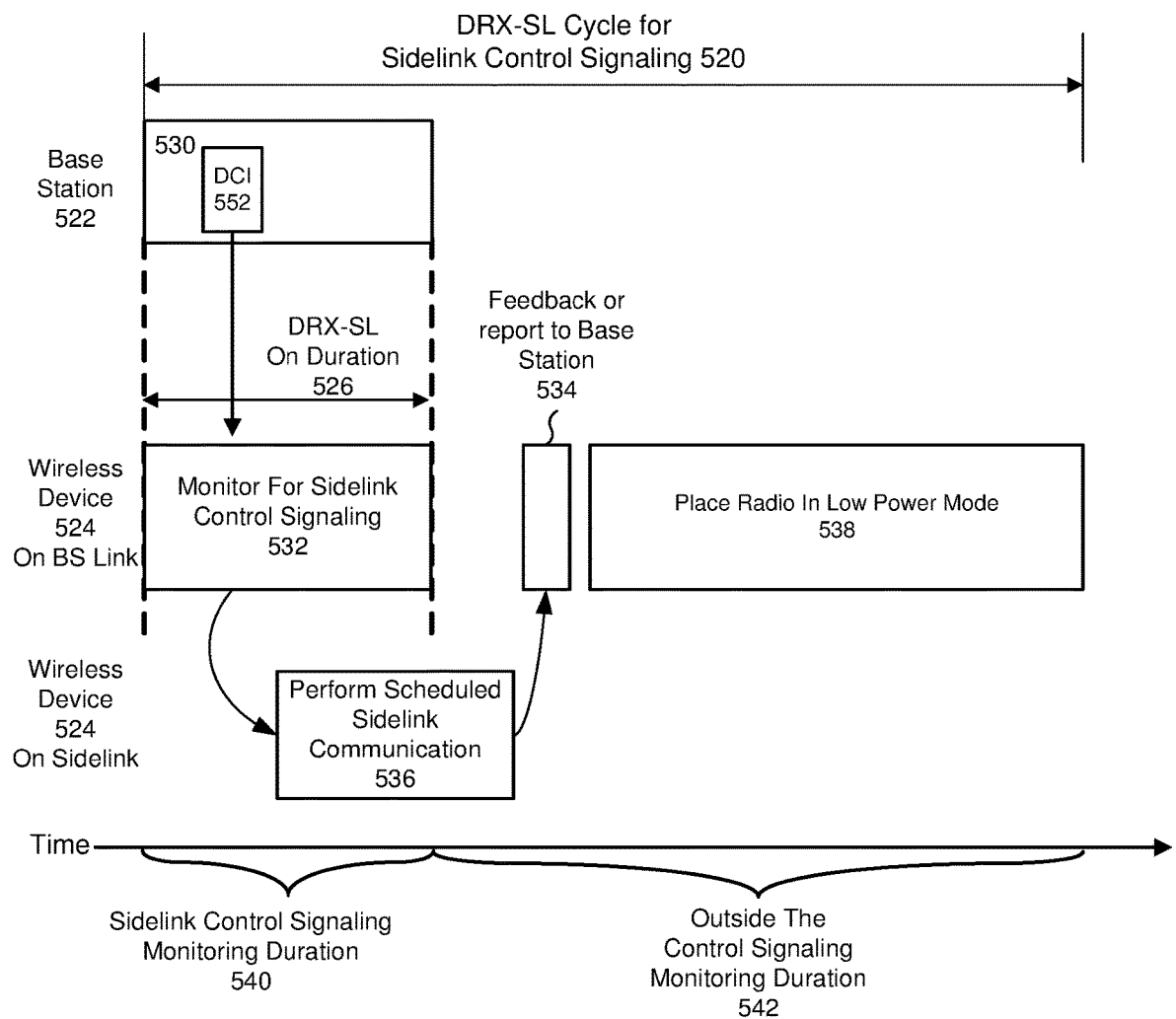

Referring to FIG. 5C, some embodiments may include sidelink control signaling with Downlink Control Information (DCI) for sidelink communication. In some embodiments, the sidelink control signaling 530 may include control information sent in a DCI 552. For example, the sidelink control signaling may include DCI format 3 (i.e., DCI3), which may dynamically schedule (e.g., using an SL-RNTI) or semi-statically activate or deactivate resource(s) (e.g., using an SLCS-RNTI or SLSPSV-RNTI) for a sidelink communication (for example, sidelink dynamic grant or sidelink configured grant type 2).

Figure 5D:
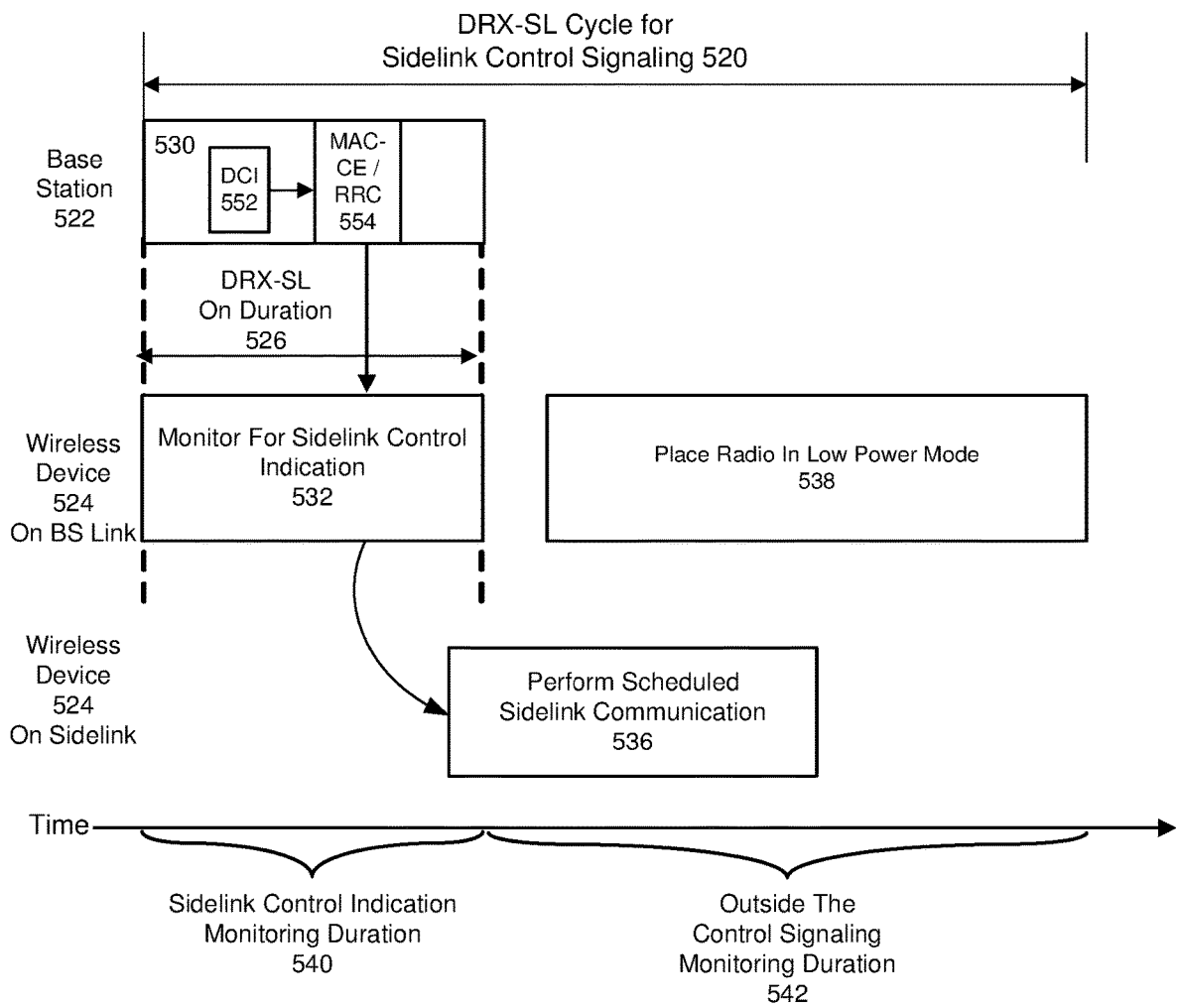

Referring to FIG. 5D, some embodiments may include a sidelink control indication with Medium Access Control (MAC) Control Element (CE) or Radio Resource Control (RRC) Information Element (IE) carried on physical downlink shared channel (PDSCH) for sidelink. In some embodiments, the sidelink control signaling may include control signalling sent in a DCI 552 in format 1 or other DCI format (e.g., DCIx) as shown in FIG. 5C or control indication with MAC CE 554 pointed to by the DCI 552, which may provide information for sidelink operation mode activation, deactivation, or switching (e.g., mode switching between sidelink resource allocation Mode 1 and Mode 2). In some embodiments, the DCI 552 in format 1 or other DCI format (e.g., DCIx) as shown in FIG. 5C or the MAC CE 554 pointed by DCI 552 may provide information for beam switching on the sidelink. In some embodiments, the sidelink control signaling may include control information with RRC information element (IE) 554 for sidelink configuration or reconfiguration (e.g., configured grant type 1 with RRC). In the example of sidelink communication using resources statically configured (i.e. configured grant type 1) or semi-persistently scheduled (i.e. configured grant type 2), no dynamic control signal is needed from the network after resource configuration with RRC (i.e. configured grant type 1) or after resource activation by DCI (i.e. DCI3 or the like for configured grant type 2), and the wireless device may place the radio of the wireless device into a low power mode (e.g., during period 538) for the base station link, i.e., not monitoring any sidelink control signaling from base station, if no feedback or report to the base station is needed.

Figure 5E:
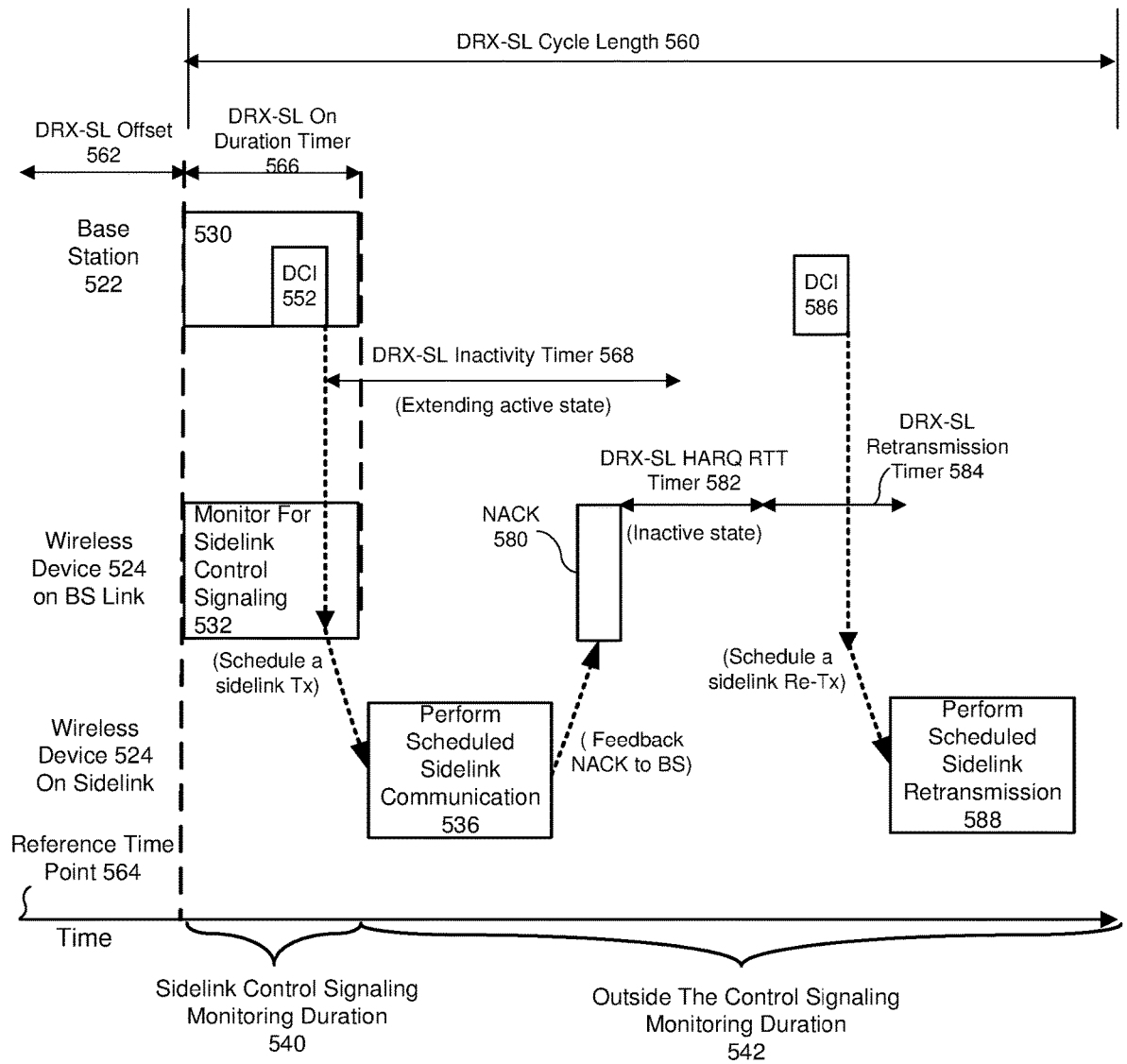
Figure 5F:
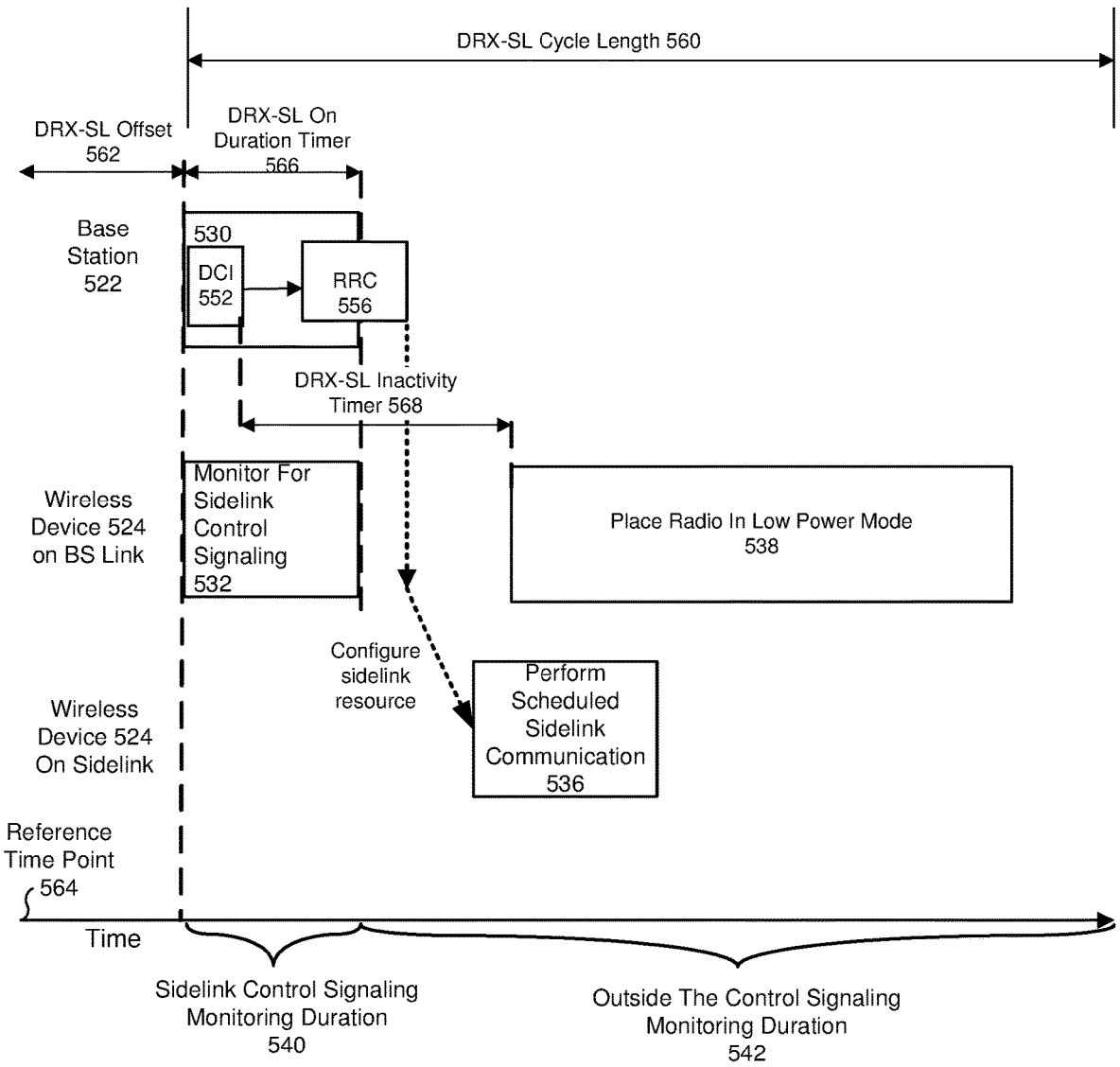

FIG. 5E illustrates an example of discontinuous reception for sidelink that includes dynamic scheduling of sidelink resources, and FIG. 5F illustrates an example of discontinuous reception for sidelink of that includes statically configured sidelink resources. In various embodiments, the DRX-SL configuration may include a configuration message (or configuration messages) that includes a variety of parameters to define the DRX-SL procedure. In some embodiments, the configuration message(s) may be configured to include one or more RRC information elements. Examples of such parameters may include a DRX-SL Cycle Length 560 and a DRX-SL Offset 562 (e.g., from a reference time point 564) of the DRX-SL cycle. The parameters may also include a DRX-SL On Duration Tinier 566 during which the wireless device may monitor for sidelink control signaling from the base station. The parameters may also include a DRX-SL Inactivity Tinier 568. In some embodiments, the DRX-SL Inactivity Tinier 568 may indicate a duration of how long the wireless device should operate its radio in an active communication state (i.e., an active time) after DCI 552 indicating a sidelink communication 536. In some embodiments, the wireless device may start (or restart) the DRX-SL Inactivity Tinier 568 to extend the active time if the wireless device receives control signaling (e.g., for sidelink and/or downlink or uplink, such as a PDCCH) indicating a transmission or communication.

Such parameters may also include a DRX-SL HARQ RTT Tinier 582 (e.g., a round trip timer (RTT)). In some embodiments, the DRX-SL HARQ RTT Tinier 582 may indicate a minimum duration from a sidelink HARQ feedback occasion (e.g., a NACK 580 feedback as shown, or if no feedback is sent) on base station link for sidelink communication 536 and before a sidelink resource(s) assignment for sidelink HARQ retransmission or sidelink blind retransmission (e.g., a retransmission with HARQ feedback disabled or without HARQ feedback) 588 by DCI 586, during which the wireless device may place its radio in an inactive communication state. In some embodiments, the DRX-SL HARQ RTT Tinier 582 may indicate a minimum duration before a sidelink retransmission grant is expected by a wireless device. In some embodiments, the wireless device may start a timer configured by the DRX-SL HARQ RTT Tinier 582 in a first symbol or slot after the end of a corresponding transmission occasion for sidelink HARQ feedback on a base station link, such as via the Physical Uplink Control Channel (PUCCH) or Physical Uplink Shared Channel (PUSCH).

Such parameters may also include a DRX-SL Retransmission Tinier 584 that may indicate a maximum duration to wait for a grant for sidelink retransmission 588 scheduled by DCI 586. The DRX-SL Retransmission Tinier 584 for the corresponding sidelink HARQ process may be started after the expiration of the DRX-SL HARQ RTT Tinier 582. The DRX-SL configuration may include other parameters, additional parameters, or fewer parameters, without limitation.

Figure 6A:
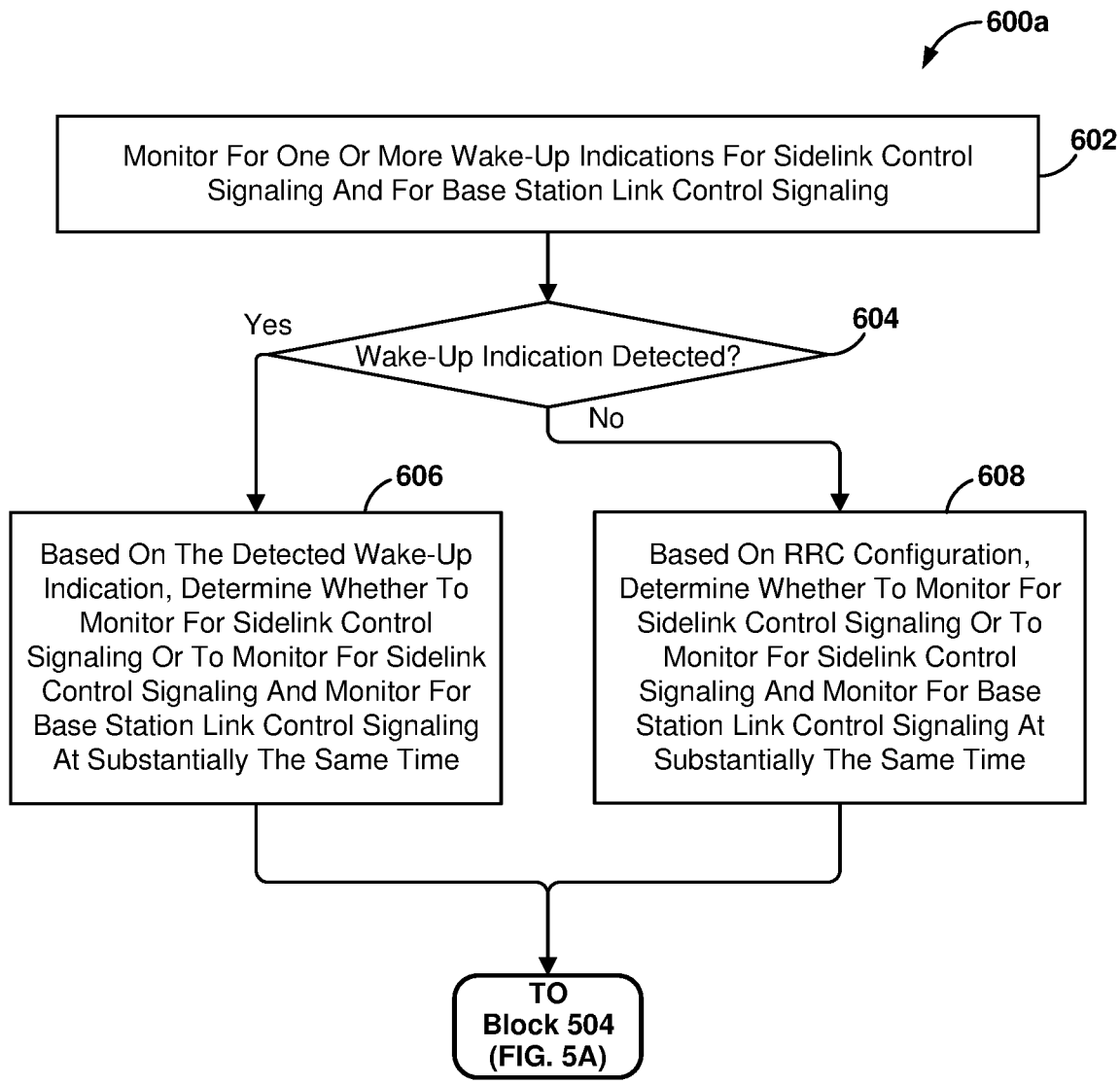
FIG. 6A is a process flow diagram and FIG. 6B is a conceptual diagram illustrating operations that may be performed by a processor of a wireless device as part of the method for discontinuous reception for sidelink control signaling according to various embodiments.
Figure 6B:
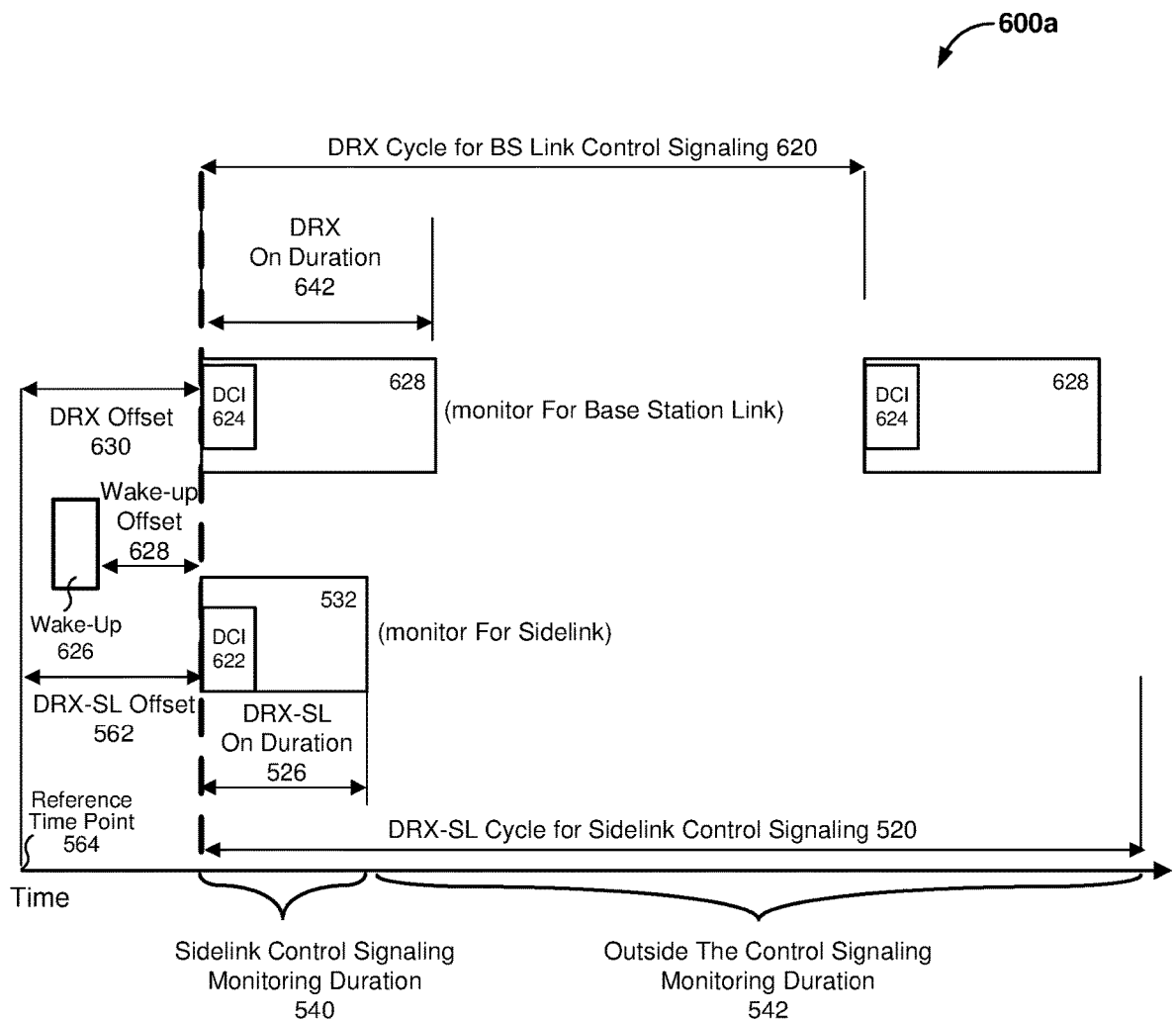

FIG. 6A is a process flow diagram and FIG. 6B is a conceptual diagram illustrating operations 600a that may be performed by a processor of a wireless device as part of the method 500 for DRX-SL for sidelink control signaling according to various embodiments. With reference to FIGS. 1-6B, the operations 600a and the method 500 may be implemented by a processor (e.g., 210, 212, 214, 216, 218, 252, 260, 428) of a wireless device (e.g., the wireless devices 120a-120e, 200, 320, 402).

In some embodiments, the transmission and reception of the sidelink control signaling (e.g., one or more DCIs for sidelink scheduling) may be coordinated with base station link control signaling. Such control signaling sent from the base station to the wireless device may configure or control aspects of the communication link between the base station and the wireless device (e.g., DCIs for DL or UL scheduling). Thus, a wireless device may monitor DCIs for both DL or UL scheduling at substantially the same time during a time duration (e.g., a DRX on duration or active time).

Referring to FIG. 6A, the processor may monitor for a wake-up indication (or for one or more wake-up indications), if configured, for sidelink control signaling and/or base station link control signaling from the base station in block 602. In some embodiments, the base station may send to the wireless device (e.g., in any of the control signaling described above, or in a separate signal) a configuration of the wake-up indication, such as a transmission opportunity or timing in which the processor may monitor for the wake-up indication.

In determination block 604, the processor may determine whether the processor detects a wake-up indication.

In response to determining that a wake-up indication is detected (i.e., determination block 604="Yes"), and based on the detected wake-up signaling, the processor may determine whether to monitor for the sidelink control signaling or for the base station link control signaling, or whether to monitor for both the sidelink control signaling and the base station link control signaling at substantially the same time in block 606. For example, the wake-up indication may contain a field for sidelink control signaling and a field for base station link control signaling to signal separately, to indicate to the wireless device whether to wake up for monitoring sidelink control signaling and/or for monitoring base station link control accordingly. As another example, the wake-up indication may contain a field to indicate joint signaling to the wireless device, and the wireless device may determine to wake up for monitoring both sidelink control signaling and base station link control at substantially the same time during a time duration (e.g., during a DRX-on duration or active time) based on that indication.

In response to determining that a wake-up indication is not detected (i.e., determination block 604="No"), based on RRC configuration information for the absence of wake-up indication or for power saving and/or reliability requirements, the processor may determine whether to monitor for the sidelink control signaling or for the base station link control signaling, or to monitor for the sidelink control signaling and the base station link control signaling at substantially the same time in block 608. For example, for saving power, the processor may skip monitoring for the sidelink control signaling or for the base station link control signaling, or for both the sidelink control signaling and the base station link control signaling in block 608; or for reliability, the processor may monitor for the sidelink control signaling or for the base station link control signaling, or for both the sidelink control signaling and the base station link control signaling in block 608.

Following the operations of block 606 or block 608, the processor may perform the operations of block 504 (FIG. 5A).

Referring to FIG. 6B, the wireless device may be configured to perform DRX-SL for sidelink control signaling (e.g., the cycle 520), and DRX for base station link control signaling (e.g., a DRX cycle for base station link control signaling 620). In this example, a DRX offset value 630 may be the same for the DRX cycle for base station link control signaling 620 and the DRX-SL Cycle for Sidelink Control Signaling 520. In some embodiments, a DRX-SL Offset 562 may be configured with the same value as a DRX Offset 630, or a value of the DRX Offset 630 may be used for both DRX cycle for base station link control signaling 620 and the DRX-SL Cycle for Sidelink Control Signaling 520. For example, when in RRC CONNECTED mode, if Uu DRX is configured, the wireless device may monitor the PDCCH for dynamically scheduled sidelink transmission or retransmission using SL-RNTI, configured scheduled sidelink transmission or retransmission using SLCS-RNTI (e.g., activation or deactivation of sidelink configured grant type 2) and/or semi-persistently scheduled sidelink transmission or retransmission for V2X sidelink communication using SLSPSV-RNTI during Uu DRX on duration or active time. The wireless device may not need to monitor the PDCCH for sidelink dynamic grant for dynamically scheduled sidelink transmission or retransmission using SL-RNTI, configured scheduled sidelink transmission or retransmission using SLCS-RNTI and/or semi-persistently scheduled sidelink transmission or retransmission for V2X sidelink communication using SLSPSV-RNTI during Uu DRX in-active time.

Similarly, the DRX cycle 620 may be the same or different. For example, the DRX cycle for base station link control signaling 620 may be configured with the same value as DRX-SL Cycle for Sidelink Control Signaling 520, or the DRX cycle for base station link control signaling 620 may be used for monitoring both base station link control signaling and sidelink control signaling. Similarly, a DRX On Duration 642 may be the same or different. For example, the DRX On Duration 642 for the base station link control signaling may be configured with the same value as the DRX-SL On Duration 526 for sidelink control signaling, or the DRX On Duration 642 may be used for both base station link control signaling and sidelink control signaling. At a time indicated by Wake-up Offset 628, the processor may optionally monitor for a wake-up indication 626 from the base station. If a wake-up indication is detected, the processor may determine, based on the control information carried on Wake-up indication 626, whether to wake up (i.e., to operate the radio in an active mode or a powered on mode) for the DRX cycle for base station link control signaling 620 and/or the DRX-SL Cycle for sidelink control signaling 520. If the processor determines to wake up, the processor may monitor for control signaling such as a DCI 624 that includes base station link control signaling, such as when the wireless device is configured to perform DRX-SL (e.g., within Uu DRX On or active time).

At substantially the same time, the processor may monitor for sidelink control signaling (e.g., 532), such as a DCI 622. In some embodiments, the processor may monitor a CORESET of DCI 624 for downlink and uplink control signaling for the base station link (e.g., DCI1 or DCI0) and may monitor CORESET of DCI 622 for sidelink control signalling (e.g., DCI3 or DCIx) at substantially the same time duration (e.g., a DRX on duration or active time). In some embodiments, the processor may monitor both CORESETs in the same search space within an active downlink bandwidth part (e.g., if the CORESETS are frequency division multiplexed). In some embodiments, the processor may monitor a joint CORESET for both DCI 624 and DCI 622 in a search space within an active downlink bandwidth part at substantially the same time within a time duration (e.g., a DRX on duration or active time).

Figure 6C:
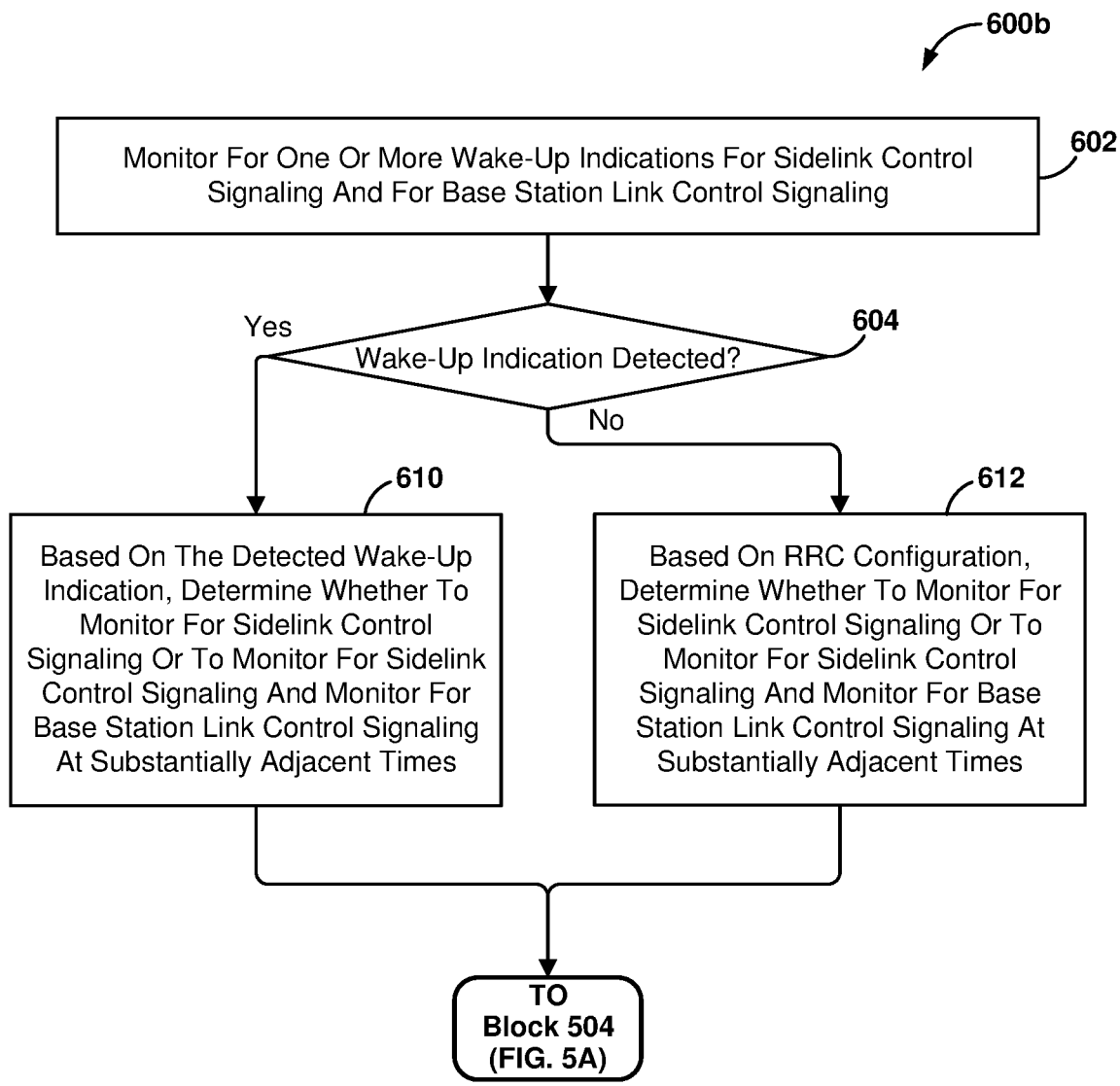
FIG. 6C is a process flow diagram and FIG. 6D is a conceptual diagram illustrating operations that may be performed by a processor of a wireless device as part of the method for discontinuous reception for sidelink control signaling according to various embodiments.
Figure 6D:
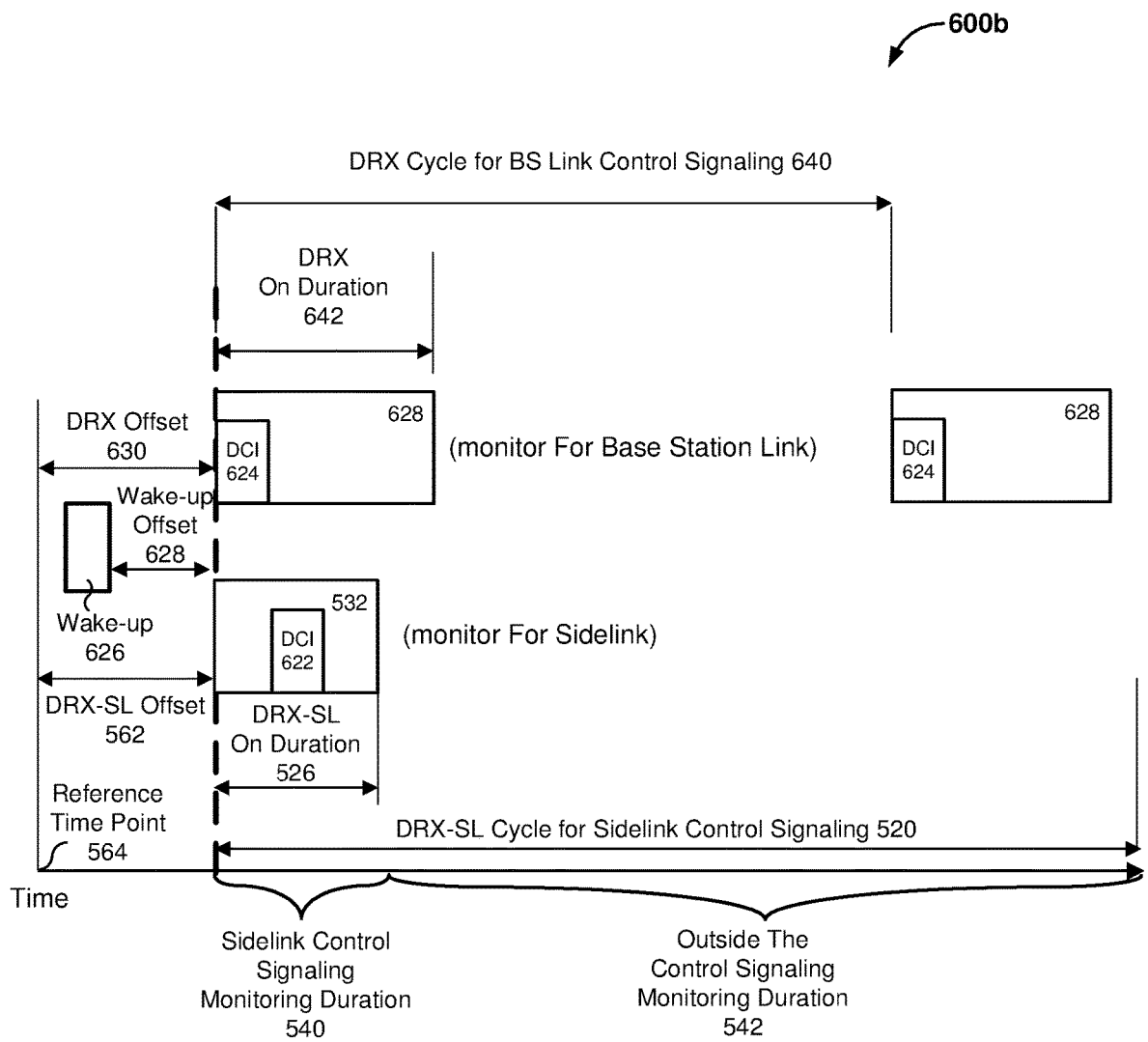

FIG. 6C is a process flow diagram and FIG. 6D is a conceptual diagram illustrating operations 600b that may be performed by a processor of a wireless device as part of the method 500 for DRX-SL for sidelink control signaling according to various embodiments. With reference to FIGS. 1-6D, the operations 600b and the method 500 may be implemented by a processor (e.g., 210, 212, 214, 216, 218, 252, 260, 428) of a wireless device (e.g., the wireless devices 120a-120e, 200, 320, 402).

Referring to FIG. 6C, in some embodiments, the wireless device may additionally be configured to monitor control signals or indications for the base station link and the sidelink at substantially adjacent times within a time duration (e.g., a DRX on duration or active time).

In response to determining that a wake-up indication is detected (i.e., determination block 604="Yes"), and based on the detected wake-up signaling, the processor may determine whether to monitor for the sidelink control signaling or for the base station link control signaling, or to monitor for the sidelink control signaling and the base station link control signaling at substantially adjacent times in block 610. For example, the wake-up indication may contain a field for sidelink control signaling and a field for base station link control signaling to signal separately, to indicate to the wireless device whether to wake up for monitoring sidelink control signaling and/or for monitoring base station link control accordingly. As another example, the wake-up indication may contain a field to indicate joint signaling to the wireless device, and the wireless device may determine to wake up for monitoring sidelink control signaling and base station link control at substantially adjacent times within a time duration (e.g., a DRX on duration or active time) based on that indication.

In response to determining that a wake-up indication is not detected (i.e., determination block 604="No"), and based on RRC configuration information for the absence of wake-up indication or for power saving and/or reliability requirements, the processor may determine whether to monitor for the sidelink control signaling or for the base station link control signaling, or whether to monitor for the sidelink control signaling and the base station link control signaling at substantially adjacent times within a time duration (e.g., a DRX on duration or active time) in block 612.

Following the operations of block 610 or block 612, the processor may perform the operations of block 504 (FIG. 5A).

Referring to FIG. 6D, in addition to or alternative to the example illustrated in FIG. 6B, the wireless device may be configured to monitor for the control signaling that includes base station link control signaling (e.g., DCI 624), and then at a substantially adjacent time monitor for the sidelink control signaling (e.g., 532) such as a DCI 622. In some embodiments, the processor may monitor the CORESET of DCI 624 and the CORESET of DCI 622 in the same search space (or in different search spaces) respectively at a substantially adjacent time within an active downlink bandwidth part (e.g., if the CORESETS are time division multiplexed) within a time duration (e.g., a DRX on duration or active time).

Figure 6E:
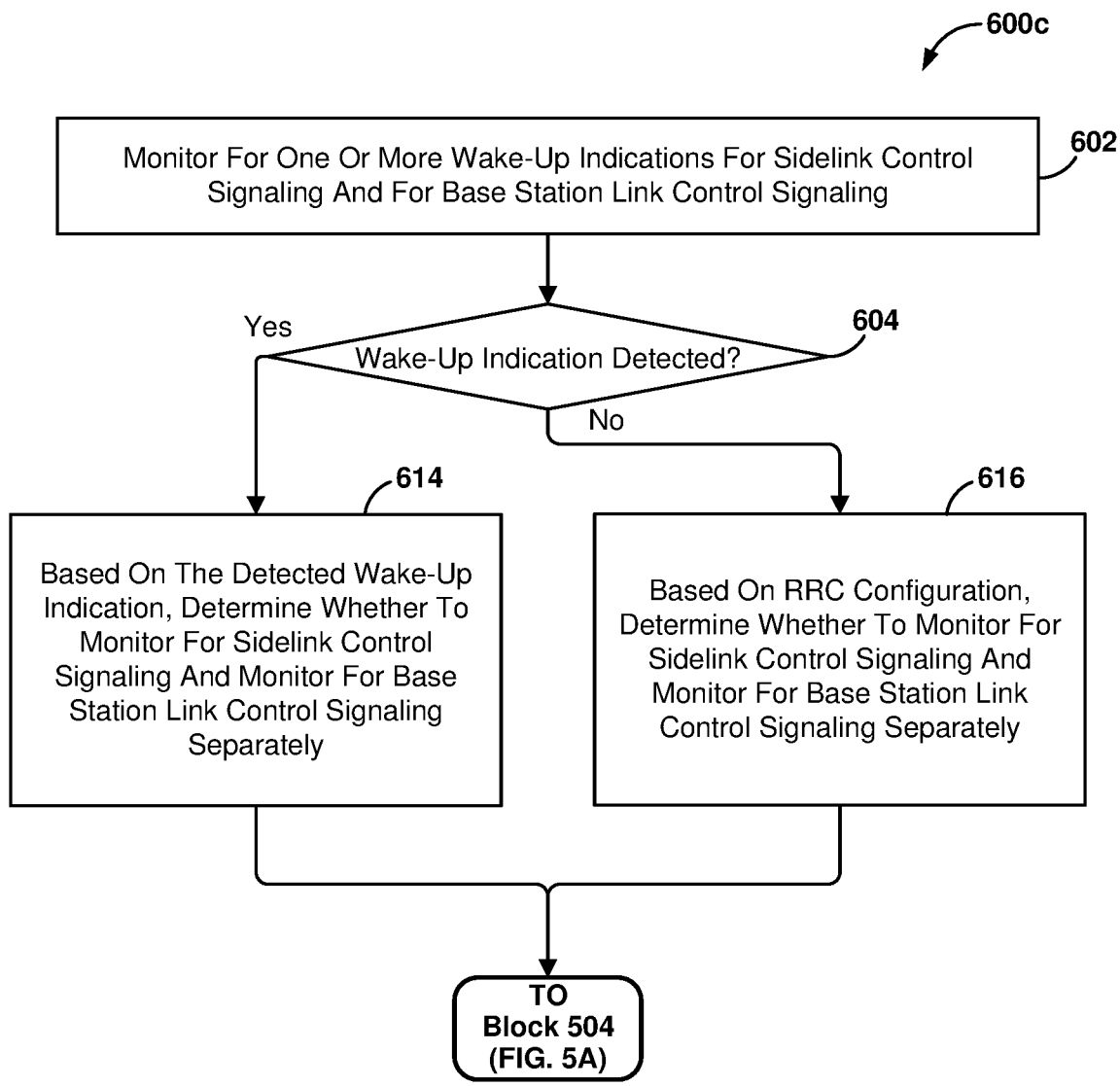
FIG. 6E is a process flow diagram and FIG. 6F is a conceptual diagram illustrating operations that may be performed by a processor of a wireless device as part of the method for discontinuous reception for sidelink control signaling according to various embodiments.
Figure 6F:
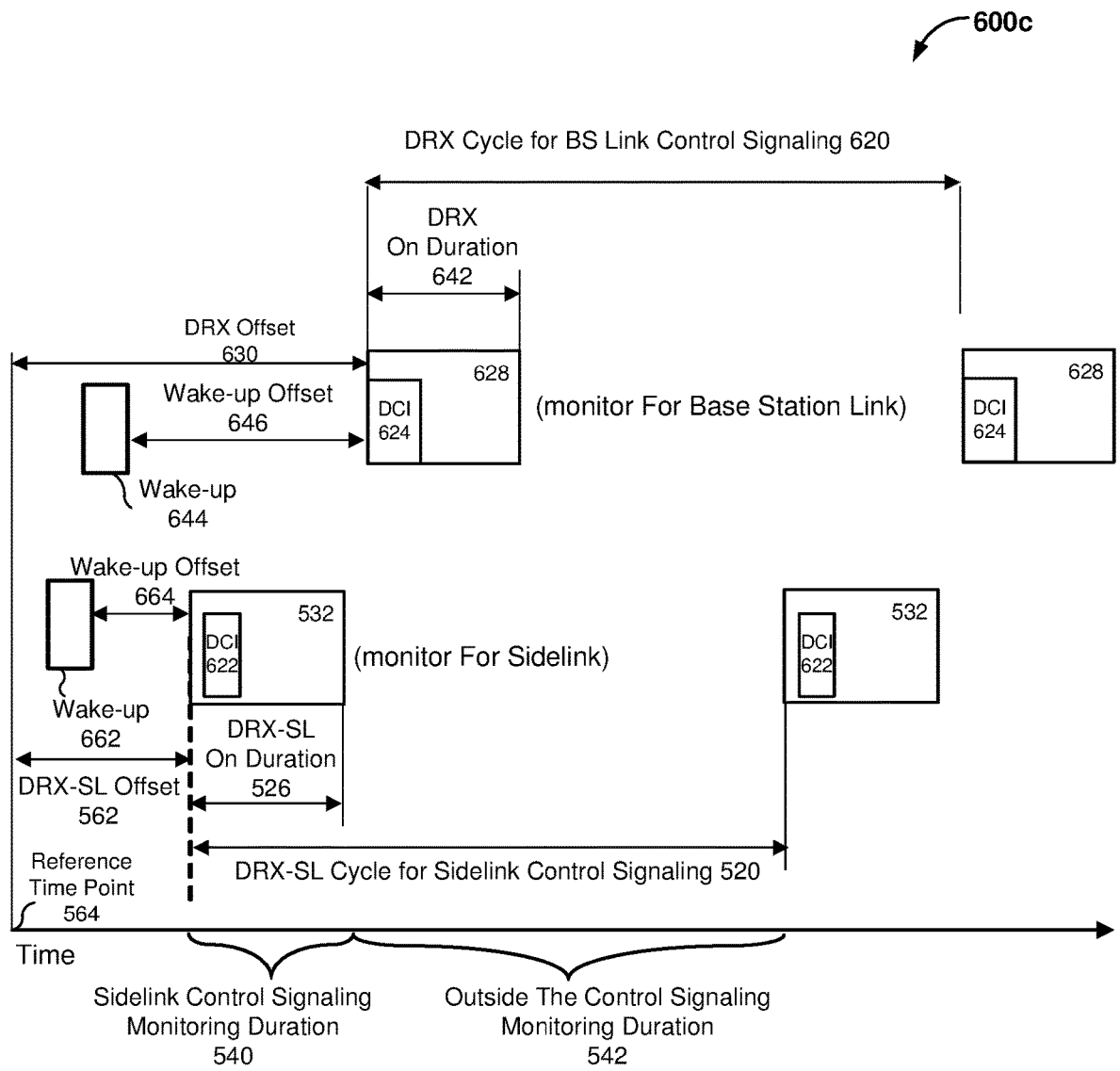

FIG. 6E is a process flow diagram 600c and FIG. 6F is a conceptual diagram illustrating operations 600c that may be performed by a processor of a wireless device as part of the method 500 for DRX-SL for sidelink control signaling according to various embodiments. With reference to FIGS. 1-6F, the operations 600c and the method 500 may be implemented by a processor (e.g., 210, 212, 214, 216, 218, 252, 260, 428) of a wireless device (e.g., the wireless devices 120a-120e, 200, 320, 402).

Referring to FIG. 6E, additionally or alternatively, in some embodiments, the wireless device may be configured to monitor control signals or indications for the base station link and the sidelink separately (e.g., different DRX on duration or active time).

In response to determining that a wake-up indication is detected (i.e., determination block 604="Yes"), and based on the detected wake-up signaling, the processor may determine whether to monitor for the sidelink control signaling or for the base station link control signaling, or whether to monitor for the sidelink control signaling and the base station link control signaling separately (e.g., at different times) in block 614. For example, the wake-up indication for sidelink control signaling may contain a field to indicate to the wireless device whether to wake up for monitoring sidelink control signaling and the wake-up indication for base station link control signaling may contain a field to indicate to the wireless device whether to wake up for monitoring base station link control signaling, and the wireless device may determine to wake up for monitoring sidelink control signaling and base station link control respectively. As another example, the wake-up indication may contain a field to indicate joint signaling to the wireless device, and the wireless device may determine to wake up for monitoring sidelink control signaling and base station link control separately (e.g., different DRX on duration or active time) based on that indication.

In response to determining that a wake-up indication is not detected (i.e., determination block 604="No"), and based on RRC configuration information for the absence of wake-up indication or for power saving and/or reliability requirements, the processor may determine whether to monitor for the sidelink control signaling or for the base station link control signaling, or to monitor for the sidelink control signaling and the base station link control signaling separately (e.g., at different time duration such as DRX on duration or active time) in block 616.

Following the operations of block 614 or block 616, the processor may perform the operations of block 504 (FIG. 5A).

Referring to FIG. 6F, in addition to or alternative to the example illustrated in FIG. 6A, the wireless device may be configured to monitor a Wake-up Indication 662 at the time indicated by Wake-up Offset 664 for sidelink control signaling and to monitor Wake-up Indication 644 at a time indicated by Wake-up Offset 646 for base station control signaling, or the common Wake-up Indication 626 (as illustrated in FIGS. 6B and 6D). Based on the detected Wake-up indication(s), if any, the wireless device may determine respectively whether to wake up or not to perform DRX-SL for sidelink control signaling (e.g., the DRX-SL Cycle 520) starting after the time offset by DRX-SL Offset 562 from the Reference Time Point 564, and/or the DRX for base station link control signaling (e.g., the DRX Cycle 620) after a different time offset by DRX Offset 630 from the Reference Time Point 564, such that the DRX-SL Cycles 520 and DRX Cycle 620 begin at different times. In some embodiments, the DRX-SL Cycles 520 and DRX Cycle 620 may be configured with the same or different cycle length, or the same or different monitoring durations (e.g., 532, 628), i.e. same or different values for DRX-SL On Duration 526 and DRX On Duration 642, for monitoring respective control signaling for the sidelink and the base station link. In some embodiments, the processor may monitor the CORESET of DCI 622 for the sidelink control signaling and monitor for the CORESET of DCI 624 for base station link control signaling in different search spaces within the same or different active downlink bandwidth parts at different DRX on duration or active time.

In some embodiments, the base station may provide to the wireless device a message indicating whether monitoring the sidelink control signaling and monitoring the base station link control signaling are coordinated, and how they are coordinated. In some embodiments, the base station may send an indication that monitoring the sidelink control signaling and monitoring the base station link control signaling may be coordinated via Radio Resource Control (RRC) message(s). The RRC message may include a control mechanism to exchange information, for example, on configurations between a base station and a wireless device. In general, an RRC message from the base station, e.g., a RRCReconfiguration message, may include a command to modify an RRC connection, and may convey information for measurement configuration, mobility control, radio resource configuration (including resource blocks, MAC main configuration, physical channel configuration, etc.), DRX configuration, etc. via different Information Elements (IEs) carried in an RRC message. For example, an RRC IE alignedUuDRX-Indication may be set to "true" to indicate coordination of monitoring the sidelink control signaling and monitoring the base station link control signaling). As another example, the wireless device may indicate coordination of monitoring the sidelink control signaling and monitoring the base station link control signaling in an RRC message, e.g., sidelinkUEInformationNR message, to the base station.

In some embodiments, the base station may indicate control signaling coordination in the RRC IE alignedUuDRX-Indication by first configuring the wireless device to provide information for coordinating the sidelink control signaling and the base station link control signaling (e.g., via an otherConfig message with alignedUuDRX-Indication, SL-AssistanceConfigNR or DRX-SL-PreferenceConfig containing alignedUuDRX-Indication). In response, the wireless device may provide the information (e.g., via a UEAssistanceInformation with alignedUuDRX-Indication or DRX-SL-Preference or SL-UE-AssistanceInformationNR containing alignedUuDRX-Indication) for coordinating the sidelink control signaling and the base station link control signaling (e.g., alignedUuDRX-Indication may be set to "true"). The base station may then send to the wireless device one or more RRC reconfiguration messages to coordinate the sidelink control signaling and the base station link control signaling.

The preceding examples are non-limiting, and the base station may indicate coordination of monitoring the sidelink control signaling and monitoring the base station link control signaling in a variety of RRC IEs in an RRC Reconfiguration message, as well as non-RRC signaling such Radio Access System (RAS) signaling for RRC Inactive state or RRC Idle state.

In some embodiments, some of the configuration information (e.g., the DRX-SL Cycle 520 and 560, DRX-SL On Duration 526 and 566, DRX-SL Inactivity Timer 568, DRX-SL HARQ RTT Timer 582, DRX-SL Retransmission Timer 584) for the DRX-SL for sidelink control signaling (e.g., the DRX-SL Cycle 520 and 560 and/or DRX-SL On Duration 526 and 566) may be bundled with or sent in one or more messages with configuration information for the DRX for base station link control signaling (e.g., the DRX Cycle 620 and 640 and/or DRX On Duration 642), for example, when DRX-SL Cycle 520 or 560 is DRX Cycle 620 or 640 and/or DRX-SL On Duration 526 or 566 is DRX On Duration 642. In some embodiments, the wireless device may receive the DRX configuration for base station link control signaling in a message including DRX-SL configuration for sidelink control signaling. In some embodiments, the wireless device may receive the DRX configuration in a Radio Resource Configuration (RRC) message, e.g., RRC Reconfiguration, from the base station, for example, in one or more RRC information elements (IEs). In some embodiments, the wireless device may receive the DRX-SL configuration in a NAS signaling from the base station, for example, in one or more NAS messages.

In some embodiments, some information or parameters for the DRX-SL cycle and on duration for sidelink control signaling (e.g., the DRX-SL Cycle 520 and 560 and/or DRX-SL On Duration 526 and 566) and for the DRX cycle and on duration for base station link control signaling (e.g., the DRX Cycle 620 and 640 and/or DRX On Duration 642) may be sent in one message with one or multiple values for a shared DRX cycle and one or multiple values for a shared on duration, for example, when DRX-SL Cycle 520 or 560 is DRX Cycle 620 or 640 and/or DRX-SL On Duration 526 or 566 is DRX On Duration 642. In some embodiments, some information or parameter for the DRX-SL inactivity timer (e.g., DRX-SL Inactivity Timer 568) for sidelink control signaling and for the DRX inactivity timer for base station link control signaling may be sent in one message with one or multiple values for a shared DRX inactivity timer, for example, when DRX-SL inactivity timer is DRX inactivity timer. In some embodiments, some information or parameters for the DRX-SL for sidelink control signaling (e.g., the DRX-SL Cycle 520) and/or for the DRX for base station link control signaling (e.g., the DRX Cycle 620 and 640) may be sent in a message applicable to a particular network architecture or grouping of cells or base station. In some embodiments, information or parameters for the DRX-SL for sidelink control signaling (e.g., the DRX-SL Cycle 520) and/or for the DRX for base station link control signaling (e.g., the DRX Cycle 620 and 640) may be sent in a message for configuring MAC parameters for a cell group (e.g., an RRC IE MAC-CellGroupConfig). In some embodiments, the information or parameters for the DRX-SL and/or DRX (e.g., the DRX-SL Cycles 520 and DRX Cycle 620 and 640) may be sent in a message for transferring secondary cell group (SCG) configuration information to a master cell group (MCG), or for sending a request from a central unit (CU) to a distributed unit (DU) (e.g., an RRC IE CG-Config). In some embodiments, the information or parameters for the DRX-SL and/or DRX (e.g., the DRX-SL Cycles 520 and DRX Cycle 620 and 640) may be sent in a message for an MCG to establish, modify or release an SCG, or from CU to DU (e.g., an RRC IE CG-ConfigInfo).

In some embodiments, some of configuration information for the DRX-SL for sidelink control signaling (e.g., the DRX-SL Cycle 520 and 560, DRX-SL On Duration 526 and 566, DRX-SL Inactivity Timer 568, DRX-SL HARQ RTT Timer 582, DRX-SL Retransmission Timer 584) may be configured in an RRC IE for Mode 1 sidelink communication (e.g., sl-ScheduledConfig). For example, the configuration information for the DRX-SL for sidelink control signaling may be sent in a mac-MainConfigSL IE under a SL-ScheduledConfig IE or under a MAC-MainConfigSL IE. In some embodiments, configuration information for the DRX-SL for sidelink control signaling may be configured in an RRC IE sl-ScheduledConfig under an RRC IE sl-ConfigCommonNR (SB12). In some embodiments, configuration information for the DRX-SL for sidelink control signaling may be configured in an RRC IE sl-ScheduledConfig under an RRC IE sl-ConfigDedicatedNR.

The preceding examples are non-limiting, and the base station may indicate coordination of the sidelink control signaling and the base station link control signaling in a variety of messages, information elements, and other control signaling.

Figure 7:
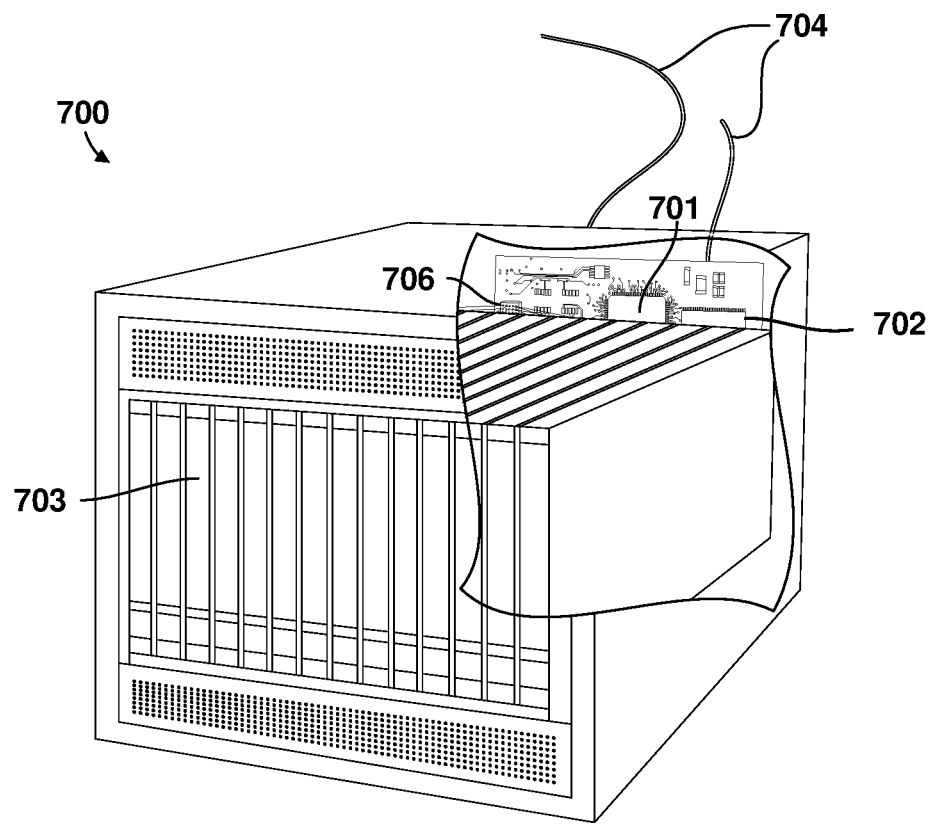
FIG. 7 is a component block diagram of a network computing device suitable for use with various embodiments.

Various embodiments, including the methods and operations 500, 600a, 600b, and 600c may be performed in a variety of network computing device, an example of which is illustrated in FIG. 7 that is a component block diagram of a network computing device 700 suitable for use with various embodiments. Such network computing devices may include at least the components illustrated in FIG. 7. With reference to FIGS. 1-7, a network computing device 700 may include a processor 701 coupled to volatile memory 702 (e.g., 426) and a large capacity nonvolatile memory, such as a disk drive 703. The network computing device 700 may also include a peripheral memory access device such as a floppy disc drive, compact disc (CD) or digital video disc (DVD) drive 706 coupled to the processor 701. The network computing device 700 may also include network access ports 704 (or interfaces) coupled to the processor 701 for establishing data connections with a network, such as the Internet and/or a local area network coupled to other system computers and servers. The network computing device 700 may be connected to one or more antennas for sending and receiving electromagnetic radiation that may be connected to a wireless communication link. The network computing device 700 may include additional access ports, such as USB, Firewire, Thunderbolt, and the like for coupling to peripherals, external memory, or other devices.

Figure 8:
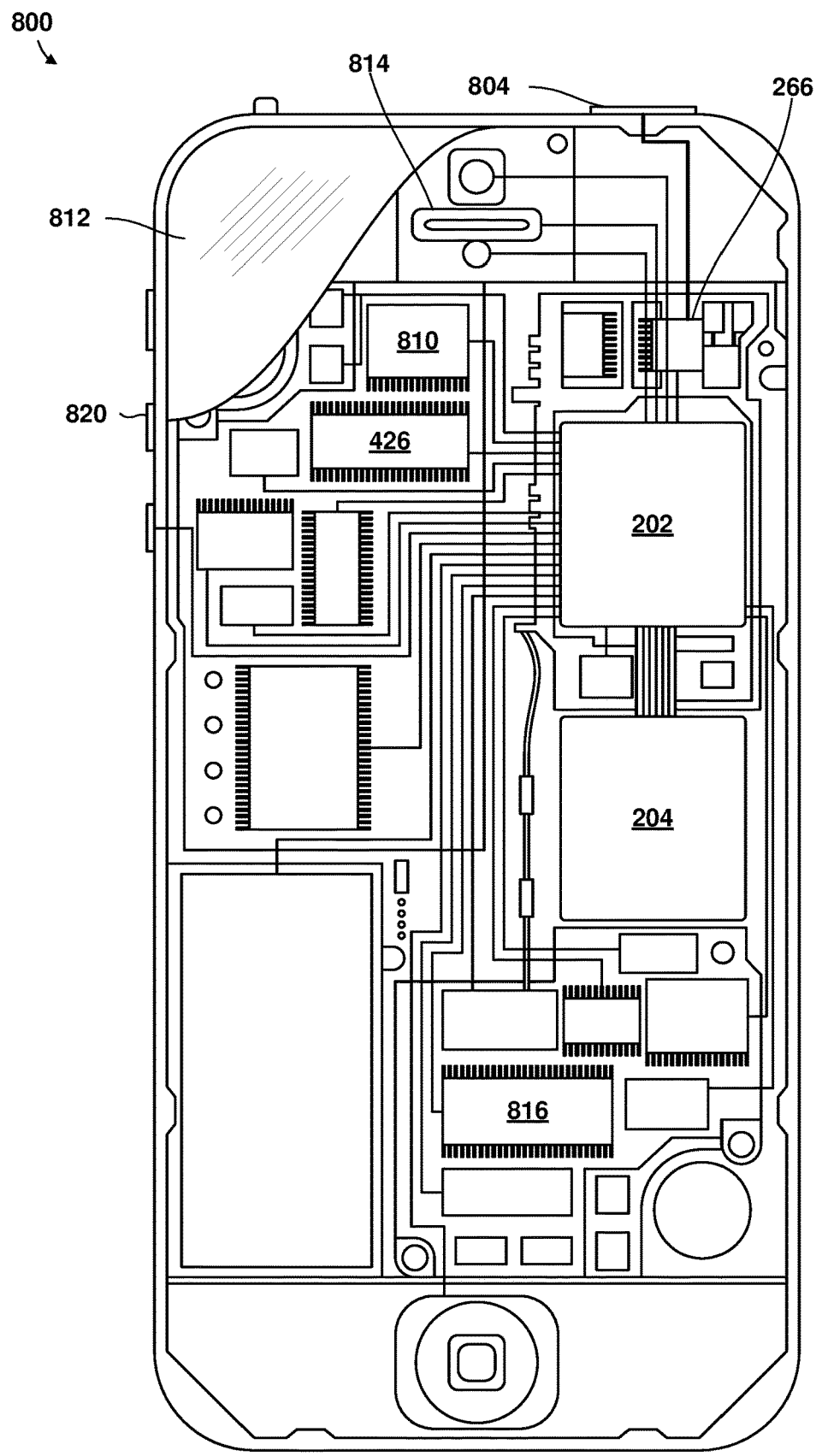
FIG. 8 is a component block diagram of a wireless device suitable for use with various embodiments.

Various embodiments, including the methods and operations 500, 600a, 600b, and 600c may be performed in a variety of wireless devices (e.g., the wireless device 120a-120e, 200, 320, 402), an example of which is illustrated in FIG. 8 that is a component block diagram of a wireless device 800 suitable for use with various embodiments. With reference to FIGS. 1-8, a wireless device 800 may include a first SOC 202 (e.g., a SOC-CPU) coupled to a second SOC 204 (e.g., a 5G capable SOC). The first and second SOCs 202, 204 may be coupled to internal memory 426, 816, a display 812, and to a speaker 814. Additionally, the wireless device 800 may include an antenna 804 for sending and receiving electromagnetic radiation that may be connected to a wireless data link and/or cellular telephone transceiver 266 coupled to one or more processors in the first and/or second SOCs 202, 204. The wireless device 800 may also include menu selection buttons or rocker switches 820 for receiving user inputs.

The wireless device 800 also may include a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 810 may include a digital signal processor (DSP) circuit (not shown separately).

The processors of the network computing device 800 and the wireless device 800 may be any programmable microprocessor, microcomputer or multiple processor chip or chips that can be configured by software instructions (applications) to perform a variety of functions, including the functions of the various embodiments described below. In some wireless devices, multiple processors may be provided, such as one processor within an SOC 204 dedicated to wireless communication functions and one processor within an SOC 202 dedicated to running other applications. Software applications may be stored in the memory 426, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods or operations of 500, 600a, 600b, and 600c may be substituted for or combined with one or more operations of the methods or operations of 500, 600a, 600b, and 600c.

Implementation examples are described in the following paragraphs. While some of the following implementation examples are described in terms of example methods, further example implementations may include: the example methods discussed in the following paragraphs implemented by a wireless device including a processor configured with processor-executable instructions to perform operations of the methods of the following implementation examples; the example methods discussed in the following paragraphs implemented by a wireless device including means for performing functions of the methods of the following implementation examples; and the example methods discussed in the following paragraphs may be implemented as a non-transitory processor-readable storage medium having stored thereon processor-executable instructions configured to cause a processor of a wireless device to perform the operations of the methods of the following implementation examples.

Example 1. A method performed by a processor of a wireless device for discontinuous reception, including monitoring for sidelink control signaling from a base station using a radio of the wireless device during a sidelink control signaling monitoring duration, receiving the sidelink control signaling, in which the sidelink control signaling allocates a sidelink communication resource and schedules a sidelink communication, performing the scheduled sidelink communication based on the received sidelink control signaling, and placing the radio of the wireless device into a low power mode outside of the sidelink control signaling monitoring duration when no sidelink communication is scheduled.

Example 2. The method of example 1, further including monitoring for wake-up indication from the base station using the radio of the wireless device, and determining to monitor for sidelink control signaling based on the detected wake-up indication.

Example 3. The method of example 2, in which the wake-up indication indicates whether to monitor for sidelink control signaling during the sidelink control signaling monitoring duration or whether to monitor for the sidelink control signaling and base station link control signaling during the sidelink control signaling monitoring duration.

Example 4. The method of any of examples 1-3, further including receiving from the base station a discontinuous reception configuration, in which monitoring for the sidelink control signaling from the base station using the radio of the wireless device during the sidelink control signaling monitoring duration includes monitoring for the sidelink control signaling from the base station based on the discontinuous reception configuration.

Example 5. The method of example 4, in which receiving from the base station the discontinuous reception configuration includes receiving the discontinuous reception configuration in a message with base station link discontinuous reception configuration.

Example 6. The method of example 4, in which receiving from the base station the discontinuous reception configuration includes receiving discontinuous reception control signaling in a Radio Resource Configuration (RRC) message from the base station.

Example 7. The method of example 4, in which receiving from the base station the discontinuous reception configuration includes receiving parameters to define the discontinuous reception configuration including one or more of a cycle length, an offset value, an on-duration timer value, an inactivity timer value, a retransmission request round trip time (RTT) timer value, or a retransmission timer value.

Example 8. The method of any of examples 1-7, in which the sidelink control signaling provides information that schedules sidelink communication resources, activates a sidelink resource allocation mode, provides beam switching information, or provides sidelink configuration information.

Example 9. The method of any of examples 1-8, in which monitoring for the sidelink control signaling from the base station using the radio of the wireless device during the sidelink control signaling monitoring duration includes monitoring for the sidelink control signaling and monitoring for base station link control signaling at substantially the same time within a DRX time duration.

Example 10. The method of any of examples 1-8, in which monitoring for the sidelink control signaling from the base station using the radio of the wireless device during the sidelink control signaling monitoring duration includes monitoring a Physical Downlink Control Channel (PDCCH) for a dynamically scheduled sidelink transmission using a Sidelink-Radio Network Temporary Identifier (SL-RNTI), a configured scheduled sidelink transmission using a Sidelink Configured Scheduled (SLCS)-RNTI, or a semi-persistently scheduled sidelink transmission for vehicle-to-everything (V2X) sidelink communication using a Sidelink Semi-Persistent Scheduling-V2X (SLSPSV)-RNTI during the sidelink control signaling monitoring duration.

Example 11. The method of any of examples 1-8, in which monitoring for the sidelink control signaling from the base station using the radio of the wireless device during the sidelink control signaling monitoring duration includes monitoring for the sidelink control signaling and monitoring for base station link control signaling at substantially adjacent times within a DRX time duration.

Example 12. The method of any of examples 1-11, in which monitoring for the sidelink control signaling from the base station using the radio of the wireless device during the sidelink control signaling monitoring duration includes monitoring for a Control Resource Set (CORESET) for the sidelink control signaling and monitoring for a CORESET for base station link control signaling.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a wireless device for discontinuous reception, comprising:
monitoring for a wake-up indication from a base station using a radio of the wireless device;
monitoring, based on detecting the wake-up indication from the base station, for sidelink control signaling from the base station using the radio of the wireless device during a sidelink control signaling monitoring duration, wherein monitoring for the sidelink control signaling from the base station using the radio of the wireless device during the sidelink control signaling monitoring duration comprises monitoring for a Control Resource Set (CORESET) for the sidelink control signaling and monitoring for a CORESET for base station link control signaling based on the wake-up indication indicating to monitor for both the sidelink control signaling and the base station link control signaling, and wherein the wake-up indication comprises a field for sidelink control signaling and a field for base station link control signaling or the wake-up indication comprises a field to indicate joint signaling;

receiving the sidelink control signaling, wherein the sidelink control signaling allocates a sidelink communication resource and schedules a sidelink communication;
performing the scheduled sidelink communication based on the received sidelink control signaling; and
placing the radio of the wireless device into a low power mode outside of the sidelink control signaling monitoring duration when no sidelink communication is scheduled.

2. The method of claim 1, further comprising:
receiving from the base station a discontinuous reception for sidelink configuration;
wherein monitoring for the sidelink control signaling from the base station using the radio of the wireless device during the sidelink control signaling monitoring duration comprises monitoring for the sidelink control signaling from the base station based on the discontinuous reception for sidelink configuration.

3. The method of claim 2, wherein receiving from the base station the discontinuous reception for sidelink configuration comprises receiving the discontinuous reception for sidelink_configuration in a message with base station link discontinuous reception configuration.

4. The method of claim 2, wherein receiving from the base station the discontinuous reception for sidelink configuration comprises receiving discontinuous reception control signaling in a Radio Resource Configuration (RRC) message from the base station.

5. The method of claim 2, wherein receiving from the base station the discontinuous reception for sidelink configuration comprises receiving parameters to define the discontinuous reception configuration including one or more of a cycle length, an offset value, an on-duration timer value, an inactivity timer value, a retransmission request round trip time (RTT) timer value, or a retransmission timer value.

6. The method of claim 1, wherein the sidelink control signaling provides beam switching information for the sidelink.

7. The method of claim 1, wherein monitoring for the sidelink control signaling from the base station using the radio of the wireless device during the sidelink control signaling monitoring duration comprises monitoring for the sidelink control signaling and monitoring for the base station link control signaling at a same time within a DRX time duration.

8. The method of claim 1, wherein monitoring for the sidelink control signaling from the base station using the radio of the wireless device during the sidelink control signaling monitoring duration comprises monitoring a Physical Downlink Control Channel (PDCCH) for a dynamically scheduled sidelink transmission using a Sidelink-Radio Network Temporary Identifier (SL-RNTI), a configured scheduled sidelink transmission using a Sidelink Configured Scheduled (SLCS)-RNTI, or a semi-persistently scheduled sidelink transmission for vehicle-to-everything (V2X) sidelink communication using a Sidelink Semi-Persistent Scheduling-V2X (SLSPSV)-RNTI during the sidelink control signaling monitoring duration.

9. The method of claim 1, wherein monitoring for the sidelink control signaling from the base station using the radio of the wireless device during the sidelink control signaling monitoring duration comprises monitoring for the sidelink control signaling and monitoring for base station link control signaling at adjacent times within a DRX time duration.

10. The method of claim 1, wherein monitoring for the sidelink control signaling from the base station comprises monitoring during a discontinuous reception on duration, and wherein a discontinuous reception offset value for the base station link is the same as a discontinuous reception offset value for the sidelink.

11. A wireless device, comprising:
one or more processors configured with processor-executable instructions to:
monitor for a wake-up indication from a base station using a radio of the wireless device;
monitor, based on detecting the wake-up indication from the base station, for sidelink control signaling from the base station using the radio of the wireless device during a sidelink control signaling monitoring duration, wherein monitoring for the sidelink control signaling from the base station using the radio of the wireless device during the sidelink control signaling monitoring duration comprises monitoring for a Control Resource Set (CORESET) for the sidelink control signaling and monitoring for a CORESET for base station link control signaling based on the wake-up indication indicating to monitor for both the sidelink control signaling and the base station link control signaling, wherein the wake-up indication comprises a field for sidelink control signaling and a field for base station link control signaling or the wake-up indication comprises a field to indicate joint signaling;
receive the sidelink control signaling, wherein the sidelink control signaling allocates a sidelink communication resource and schedules a sidelink communication;
perform the scheduled sidelink communication based on the received sidelink control signaling; and
place the radio of the wireless device into a low power mode outside of the sidelink control signaling monitoring duration when no sidelink communication is scheduled.

12. The wireless device of claim 11, wherein the one or more processors are further configured to:
receive from the base station a discontinuous reception for sidelink_configuration; and
monitor for the sidelink control signaling from the base station based on the discontinuous reception for sidelink configuration.

13. The wireless device of claim 12, wherein the one or more processors are further configured to receive the discontinuous reception for sidelink configuration in a message with base station link discontinuous reception configuration.

14. The wireless device of claim 12, wherein the one or more processors are further configured to receive the discontinuous reception for sidelink configuration in a Radio Resource Configuration (RRC) message from the base station.

15. The wireless device of claim 12, wherein the discontinuous reception for sidelink configuration comprises one or more of a cycle length, an offset value, an on-duration timer value, an inactivity timer value, a retransmission request round trip time (RTT) timer value, or a retransmission timer value.

16. The wireless device of claim 11, wherein the sidelink control signaling provides beam switching information for the sidelink.

17. The wireless device of claim 11, wherein the one or more processors are configured to monitor for the sidelink control signaling and monitor for the base station link control signaling at a same time within a DRX time duration.

18. The wireless device of claim 11, wherein the one or more processors are further configured to monitor a Physical Downlink Control Channel (PDCCH) for a dynamically scheduled sidelink transmission using a Sidelink-Radio Network Temporary Identifier (SL-RNTI), a configured scheduled sidelink transmission using a Sidelink Configured Scheduled (SLCS)-RNTI, or a semi-persistently scheduled sidelink transmission for vehicle-to-everything (V2X) sidelink communication using a Sidelink Semi-Persistent Scheduling-V2X (SLSPSV)-RNTI during the sidelink control signaling monitoring duration.

19. The wireless device of claim 11, wherein the one or more processors are further configured to monitor for the sidelink control signaling and monitoring for base station link control signaling at adjacent times within a DRX time duration.

20. The wireless device of claim 11, wherein monitoring for the sidelink control signaling from the base station comprises monitoring during a discontinuous reception on duration, and wherein a discontinuous reception offset value for the base station link is the same as a discontinuous reception offset value for the sidelink.

21. A non-transitory processor-readable medium having stored thereon processor-executable instruction configured to cause a processing device in a wireless device to perform operations comprising:
monitoring for a wake-up indication from a base station using a radio of the wireless device;
monitoring, based on detecting the wake-up indication from the base station, for sidelink control signaling from the base station using the radio of the wireless device during a sidelink control signaling monitoring duration, wherein monitoring for the sidelink control signaling from the base station using the radio of the wireless device during the sidelink control signaling monitoring duration comprises monitoring for a Control Resource Set (CORESET) for the sidelink control signaling and monitoring for a CORESET for base station link control signaling based on the wake-up indication indicating to monitor for both the sidelink control signaling and the base station link control signaling, and wherein the wake-up indication comprises a field for sidelink control signaling and a field for base station link control signaling or the wake-up indication comprises a field to indicate joint signaling;
receiving the sidelink control signaling, wherein the sidelink control signaling allocates a sidelink communication resource and schedules a sidelink communication;
performing the scheduled sidelink communication based on the received sidelink control signaling; and
placing the radio of the wireless device into a low power mode outside of the sidelink control signaling monitoring duration when no sidelink communication is scheduled.

22. A wireless device, comprising:
means for monitoring for a wake-up indication from a base station using a radio of the wireless device;
means for monitoring, based on detecting the wake-up indication from the base station, for sidelink control signaling from the base station using the radio of the wireless device during a sidelink control signaling monitoring duration, wherein monitoring for the sidelink control signaling from the base station using the radio of the wireless device during the sidelink control signaling monitoring duration comprises monitoring for a Control Resource Set (CORESET) for the sidelink control signaling and monitoring for a CORESET for base station link control signaling based on the wake-up indication indicating to monitor for both the sidelink control signaling and the base station link control signaling, and wherein the wake-up indication comprises a field for sidelink control signaling and a field for base station link control signaling or the wake-up indication comprises a field to indicate joint signaling;
means for receiving the sidelink control signaling, wherein the sidelink control signaling allocates a sidelink communication resource and schedules a sidelink communication;
means for performing the scheduled sidelink communication based on the received sidelink control signaling; and
means for placing the radio of the wireless device into a low power mode outside of the sidelink control signaling monitoring duration when no sidelink communication is scheduled.

23. The wireless device of claim 22, further comprising:
means for receiving from the base station a discontinuous reception for sidelink configuration;
wherein means for monitoring for the sidelink control signaling from the base station using the radio of the wireless device during the sidelink control signaling monitoring duration comprises means for monitoring for the sidelink control signaling from the base station based on the discontinuous reception for sidelink configuration.

24. The wireless device of claim 23, wherein means for receiving from the base station the discontinuous reception for sidelink configuration comprises means for receiving the discontinuous reception for sidelink configuration in a message with base station link discontinuous reception configuration.

* * * * *